US010845950B2

(12) United States Patent
Won

(10) Patent No.: US 10,845,950 B2
(45) Date of Patent: Nov. 24, 2020

(54) WEB BROWSER EXTENSION

(71) Applicant: Microsoft Technology Licensing, LLC, Redmond, WA (US)

(72) Inventor: Sung Joon Won, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 223 days.

(21) Appl. No.: 14/972,789

(22) Filed: Dec. 17, 2015

(65) Prior Publication Data
US 2017/0177171 A1 Jun. 22, 2017

(51) Int. Cl.
*G06F 3/0482* (2013.01)
*G06F 16/248* (2019.01)
*G06F 16/957* (2019.01)
*G06F 40/14* (2020.01)
*G06F 40/134* (2020.01)
*G06F 40/166* (2020.01)
*G06F 3/0484* (2013.01)
(Continued)

(52) U.S. Cl.
CPC ........ *G06F 3/0482* (2013.01); *G06F 3/04842* (2013.01); *G06F 3/04883* (2013.01); *G06F 3/04892* (2013.01); *G06F 3/167* (2013.01); *G06F 16/248* (2019.01); *G06F 16/957* (2019.01); *G06F 40/134* (2020.01); *G06F 40/14* (2020.01); *G06F 40/166* (2020.01); *H04L 67/02* (2013.01)

(58) Field of Classification Search
CPC ......... G06F 3/0482; G06F 3/167; H04L 67/02
See application file for complete search history.

(56) References Cited

U.S. PATENT DOCUMENTS 6,262,732 B1 * 7/2001 Coleman ............... G06F 40/166
715/835
6,356,905 B1 * 3/2002 Gershman ......... G06F 17/30899
705/26.8
(Continued)

FOREIGN PATENT DOCUMENTS

KR 20140090394 A 7/2014
WO 39/01831 A1 1/1999
(Continued)

OTHER PUBLICATIONS

"Using Spotlight Search (#1043)", Retrieved from: https://www.youtube.com/watch?v=XRI3wSBcfYs&t=1s, Oct. 29, 2014, 2 pages (Year: 2014).*

(Continued)

*Primary Examiner* — Phenuel S Salomon

(57) ABSTRACT

Non-limiting examples of the present disclosure describe processing via an extension of a web browser application. A processing device, for example, may provide a web browser application that comprises an extension enabling an application service to interface with the web browser application. Input may be received in a uniform resource locator (URL) bar of the web browser application. A search of an application service may be launched directly from the URL bar based on the received input. The processing device may retrieve results from the application based on the searching. The retrieved results may be displayed within the URL bar on a display connected with the processing device. Other examples are also described.

20 Claims, 20 Drawing Sheets

(51) Int. Cl.
*G06F 3/0488* (2013.01)
*G06F 3/0489* (2013.01)
*G06F 3/16* (2006.01)
*H04L 29/08* (2006.01)

(56) References Cited

U.S. PATENT DOCUMENTS

| | | | | |
|---|---|---|---|---|
| 6,401,085 | B1* | 6/2002 | Gershman | G06F 17/30867 |
| 6,438,545 | B1* | 8/2002 | Beauregard | G06F 9/45512 |
| 6,546,554 | B1* | 4/2003 | Schmidt | G06F 9/44526 |
| | | | | 709/201 |
| 7,685,010 | B2* | 3/2010 | Goldberg | G06Q 10/06 |
| | | | | 705/7.11 |
| 7,797,301 | B1* | 9/2010 | Baird | G06F 17/30637 |
| | | | | 707/706 |
| 7,886,318 | B2* | 2/2011 | Wang | H04N 7/162 |
| | | | | 380/231 |
| 8,156,094 | B2* | 4/2012 | Jhaveri | G06F 17/30696 |
| | | | | 707/705 |
| 8,185,839 | B2* | 5/2012 | Jalon | G06F 16/168 |
| | | | | 715/769 |
| 8,196,206 | B1* | 6/2012 | Gartside | H04L 63/145 |
| | | | | 726/24 |
| 8,527,881 | B2* | 9/2013 | Selig | G06F 17/243 |
| | | | | 715/738 |
| 8,607,166 | B2* | 12/2013 | Jalon | G06F 3/0481 |
| | | | | 715/838 |
| 8,752,047 | B2 | 6/2014 | Banga et al. | |
| 8,810,512 | B2* | 8/2014 | Andersson | G06F 1/1626 |
| | | | | 345/158 |
| 8,874,144 | B1* | 10/2014 | Liu | H04W 4/029 |
| | | | | 455/456.3 |
| 9,288,118 | B1* | 3/2016 | Pattan | H04L 67/306 |
| 9,904,731 | B2* | 2/2018 | Wong | G06F 17/30864 |
| 10,200,824 | B2* | 2/2019 | Gross | G06F 3/0488 |
| 2002/0156774 | A1* | 10/2002 | Beauregard | A61K 39/385 |
| 2003/0120593 | A1* | 6/2003 | Bansal | G06F 17/30873 |
| | | | | 705/39 |
| 2005/0172018 | A1* | 8/2005 | Devine | G06F 11/0709 |
| | | | | 709/223 |
| 2006/0212548 | A1* | 9/2006 | Faisal | G06F 8/61 |
| | | | | 709/220 |
| 2007/0300161 | A1* | 12/2007 | Bhatia | G06Q 30/06 |
| | | | | 715/745 |
| 2008/0140606 | A1* | 6/2008 | Clark | G06F 16/951 |
| 2009/0112647 | A1* | 4/2009 | Volkert | G06F 17/30029 |
| | | | | 705/26.1 |
| 2009/0287559 | A1 | 11/2009 | Chen et al. | |
| 2010/0131902 | A1* | 5/2010 | Teran | G06F 17/30867 |
| | | | | 715/843 |
| 2011/0307946 | A1 | 12/2011 | Hilerio et al. | |
| 2011/0314389 | A1* | 12/2011 | Meredith | G06F 8/60 |
| | | | | 715/751 |
| 2012/0042289 | A1* | 2/2012 | Cragun | G06F 16/9577 |
| | | | | 715/865 |
| 2012/0159310 | A1* | 6/2012 | Chang | G06F 8/38 |
| | | | | 715/239 |
| 2013/0117716 | A1 | 5/2013 | Stevens | |
| 2013/0218870 | A1* | 8/2013 | Bukurak | G06F 17/30864 |
| | | | | 707/722 |
| 2013/0246365 | A1* | 9/2013 | Hornkvist | G06F 16/148 |
| | | | | 707/651 |
| 2013/0247030 | A1* | 9/2013 | Kay | H04L 67/34 |
| | | | | 717/178 |
| 2014/0025949 | A1* | 1/2014 | Kay | H04L 63/0428 |
| | | | | 713/168 |
| 2014/0047360 | A1 | 2/2014 | Kay et al. | |
| 2015/0205489 | A1 | 7/2015 | Murphy et al. | |
| 2015/0205591 | A1* | 7/2015 | Jitkoff | G06F 8/61 |
| | | | | 717/176 |
| 2015/0207800 | A1* | 7/2015 | Jitkoff | H04L 63/102 |
| | | | | 726/4 |
| 2015/0331841 | A1* | 11/2015 | Antebi | G06F 17/30206 |
| | | | | 715/229 |
| 2015/0339387 | A1* | 11/2015 | Dotsenko | G06F 17/30864 |
| | | | | 715/739 |
| 2017/0026393 | A1* | 1/2017 | Walsh | G06F 21/128 |

FOREIGN PATENT DOCUMENTS

| | | |
|---|---|---|
| WO | 2007/079388 A1 | 7/2007 |
| WO | 2012/125696 A2 | 9/2012 |
| WO | 2014078961 A1 | 5/2014 |
| WO | 2014/102750 A1 | 7/2014 |

OTHER PUBLICATIONS

PCT International Search Report and Written Opinion in International Application PCT/US2016/065479, dated Jul. 11, 2017, 20 pages.
"Chrome web store: Taco", Retrieved on: Oct. 14, 2015 Available at: https://chrome.google.com/webstore/detail/taco/aogabobfbepcehdkbfagdflinolncebh?hl=en, 2 pgs.
"Chrome web store: Wunderlist New Tab", Retrieved on: Oct. 14, 2015 Available at: https://chrome.google.com/webstore/detail/taco/aogabobfbepcehdkbfagdflinolncebh?hl=en, 2 pgs.
"Chrome Web Store: OverTask", Retrieved on: Oct. 14, 2015 Available at: https://chrome.google.com/webstore/detail/overtask/oeiijfgmbaopeehamdhiiepidbpfkcda?hl=en, 2 pgs.
"Chrome Web Store: Office Editing for Docs, Sheets & Slides", Retrieved on: Oct. 14, 2015 Available at: https://chrome.google.com/webstore/detail/office-editing-for-docs-s/gbkeegbaiigmenfmjfclcdgdpimamgkj?hl=en, 1 page.
Chambers, Mike, "Chrome Web store: Twitch Live", Retrieved on: Oct. 14, 2015 Available at: https://chrome.google.com/webstore/detail/twitch-live/iiljidcefnbhbpamageahhblhbbhhopm?hl=en, 1 page.
Schubert, Jim., "Chrome web store: New Tab Redirect", Retrieved on: Oct. 14, 2015 Available at: https://chrome.google.com/webstore/detail/new-tab-redirect/icpgjfneehieebagbmdbhnlpiopdcmna?hl=en, 1 page.
"IBM Notes 9.0.1 Browser Plug-in Help", Published on: Oct. 2013 Available at: http://infolib.lotus.com/resources/domino/Notes/9.0.1/NBP/EN/html-wrapper.html#brwplg_get_start_r, 19 pgs.
"Chrome Web store : Home—New Tab Page", Retrieved on: Oct. 14, 2015 Available at: https://chrome.google.com/webstore/detail/home-new-tab-page/ehhkfhegcenpfoanmgfpfhnmdmflkbgk?hl=en, 1 page.
O'Hagan, Matt., "Chrome Web store : Jot", Retrieved on: Oct. 16, 2015 Available at: https://chrome.google.com/webstore/detail/jot/mnemjleajnmodijhnibpekloajfdjjja, 1 page.
"How To—Spotlight Expands to Search the Web", Retrieved from: https://www.youtube.com/watch?v=hVFiOQCOXHw, Oct. 16, 2014, 3 pages.
"Office Action Issued in European Patent Application No. 16823091.0", dated Jan. 9, 2020, 5 Pages.
"Groowe Search Toolbar", Retrieved from: https://web.archive.org/web/20060721111132/http://www.groowe.com:80/, Jul. 21, 2006, 2 Pages.
"Improve Spotlight Searches with Search Operators in Mac OS X", Retrieved from: https://osxdaily.com/2010/01/06/improve-your-spotlight-searches-with-search-operators/, Jan. 6, 2010, 5 Pages.
"Summons to Attend Oral Proceedings Issued in European Patent Application No. 16823091.0", dated Jun. 3, 2020, 8 Pages.
"Summons to Attend Oral Proceedings issued in European Patent Application No. 16823091.0", dated Jun. 19, 2020, 8 Pages.
"Summons to Attend Oral Proceedings Issued in European Patent Application No. 16823091.0", dated May 20, 2020, 9 Pages.

* cited by examiner

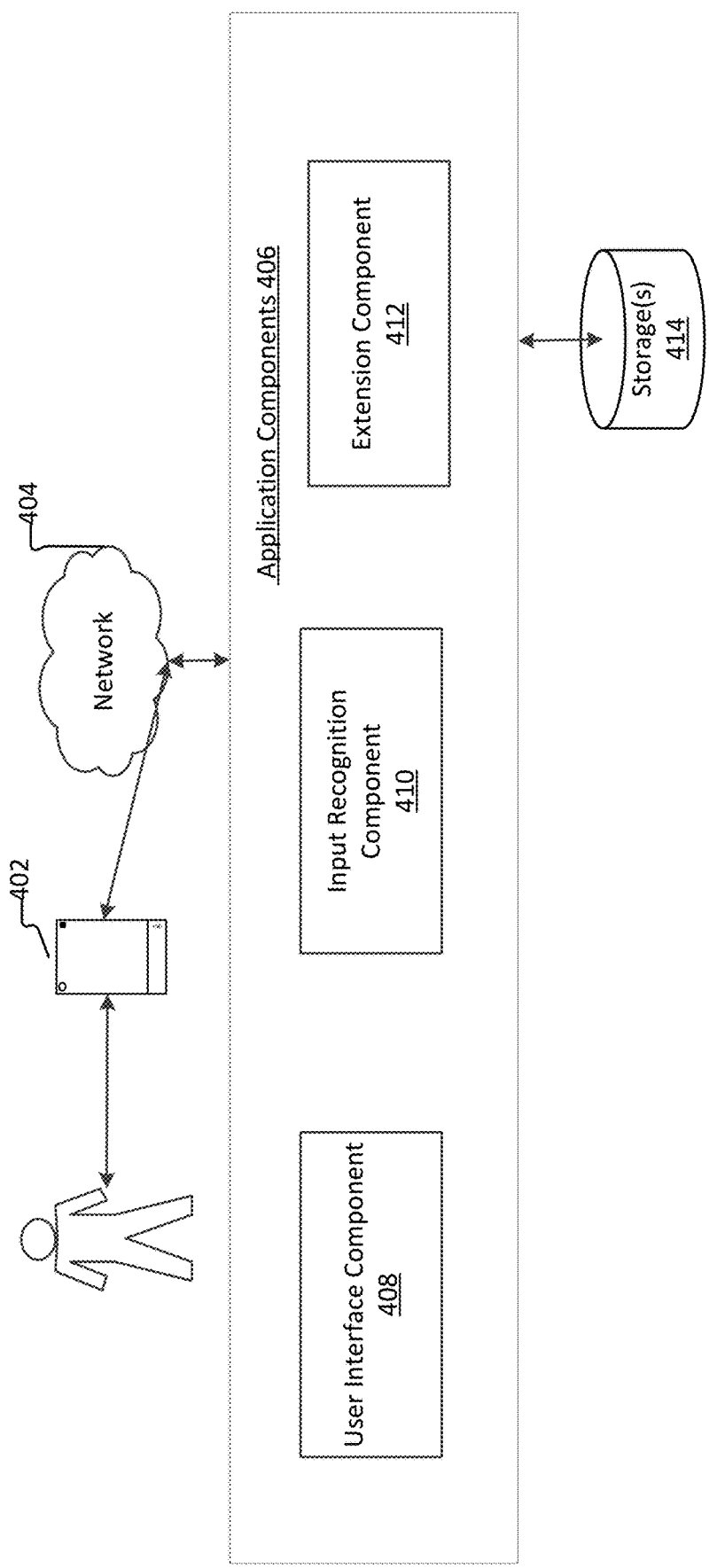

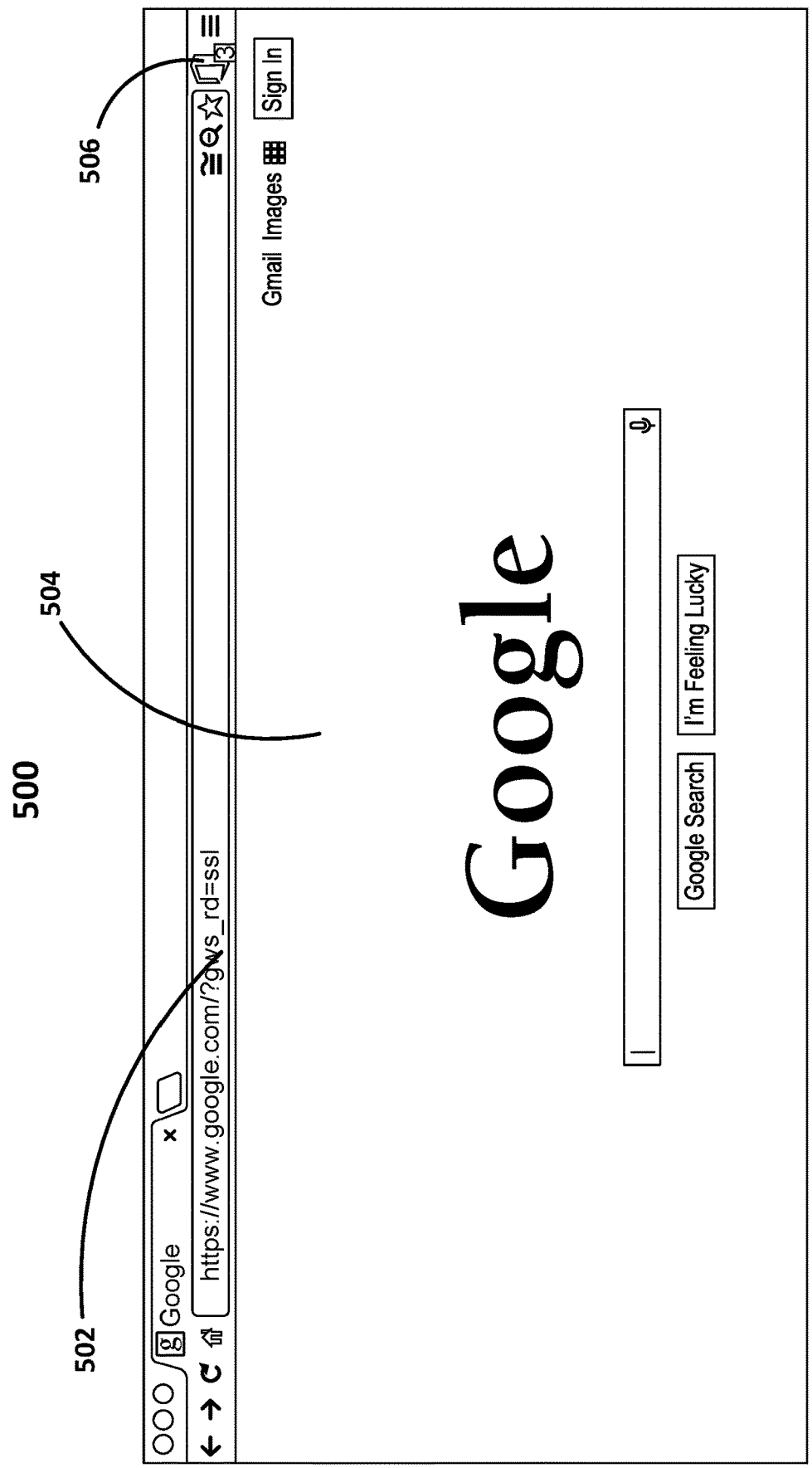

540

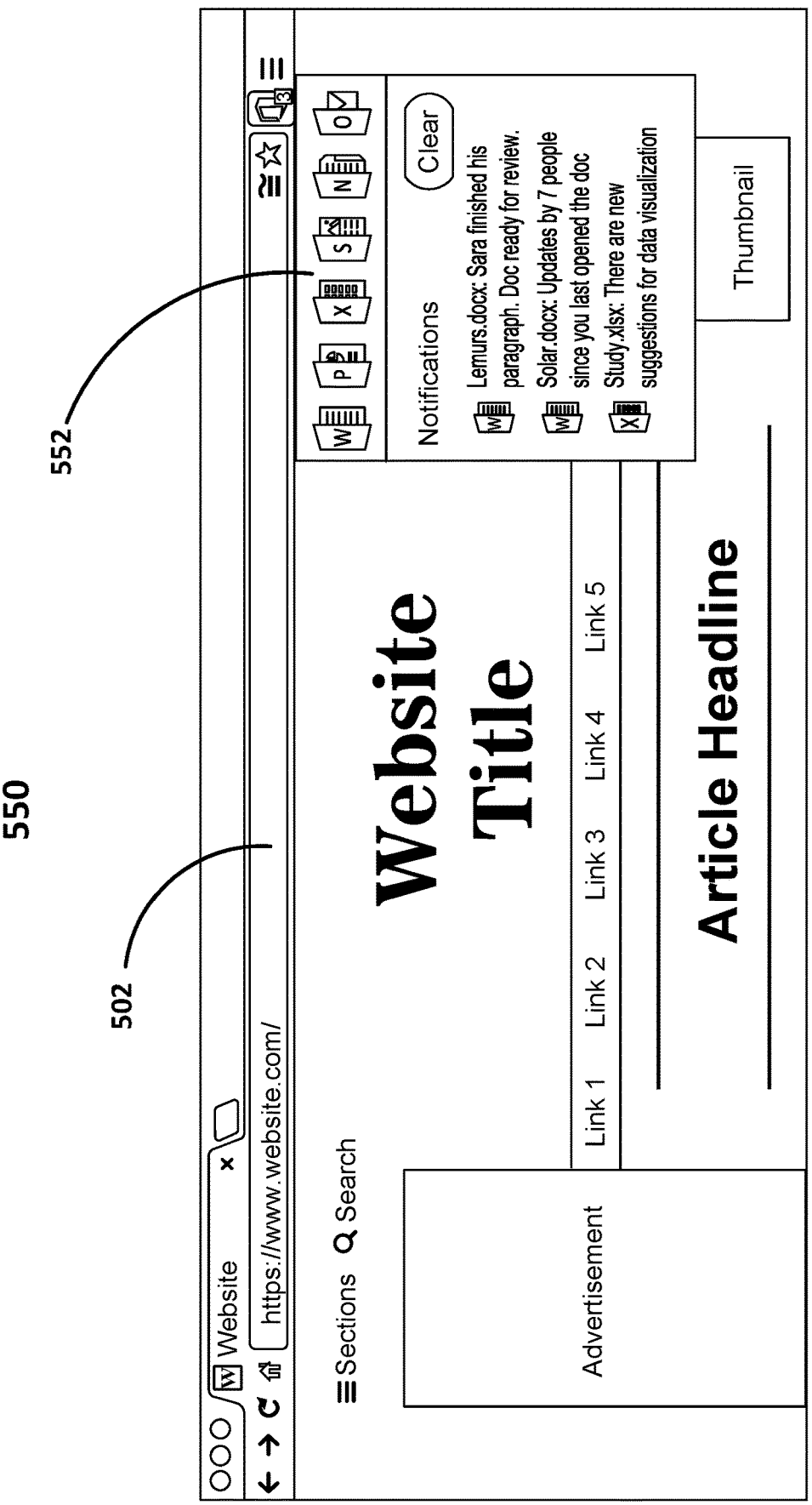

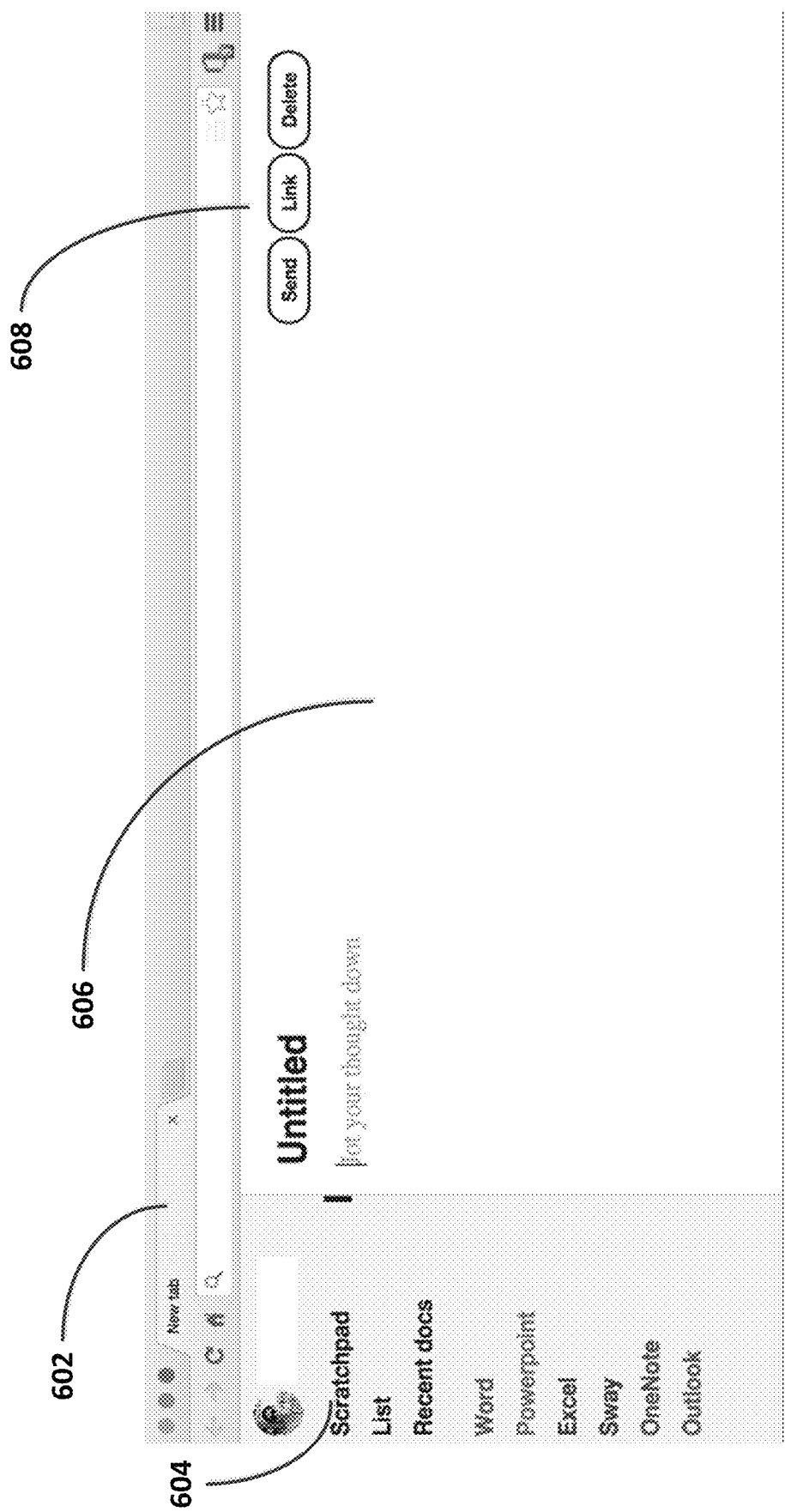

FIG. 7A
700
702
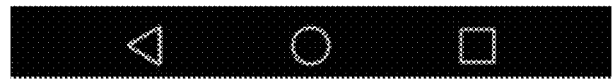

FIG. 7B
720
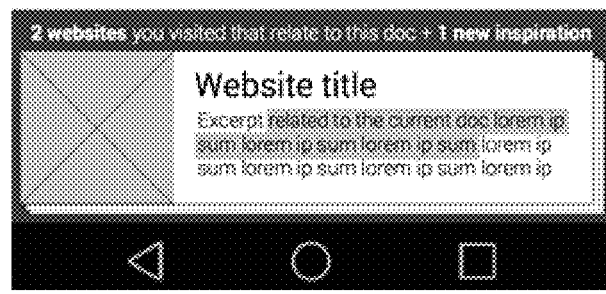
722

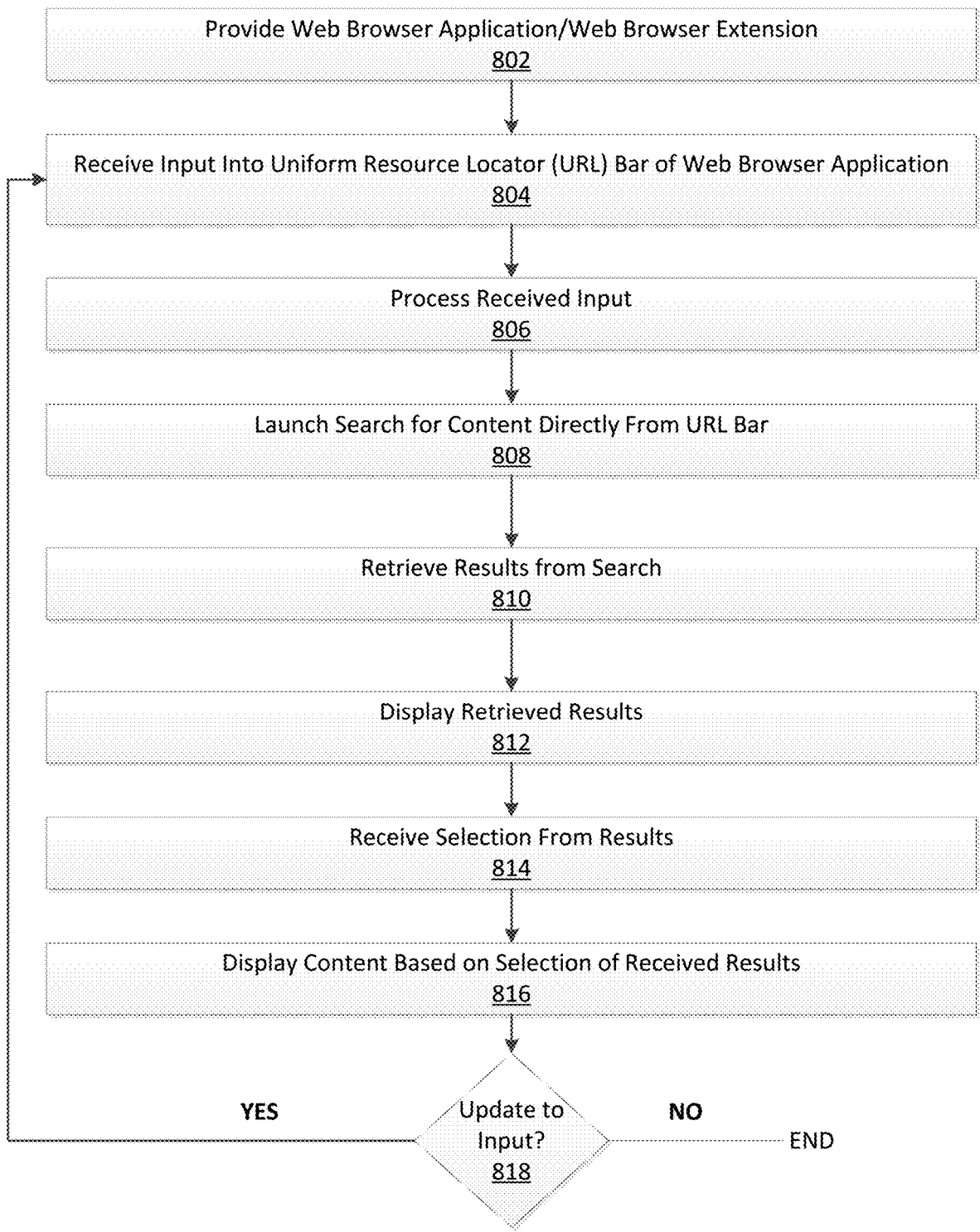

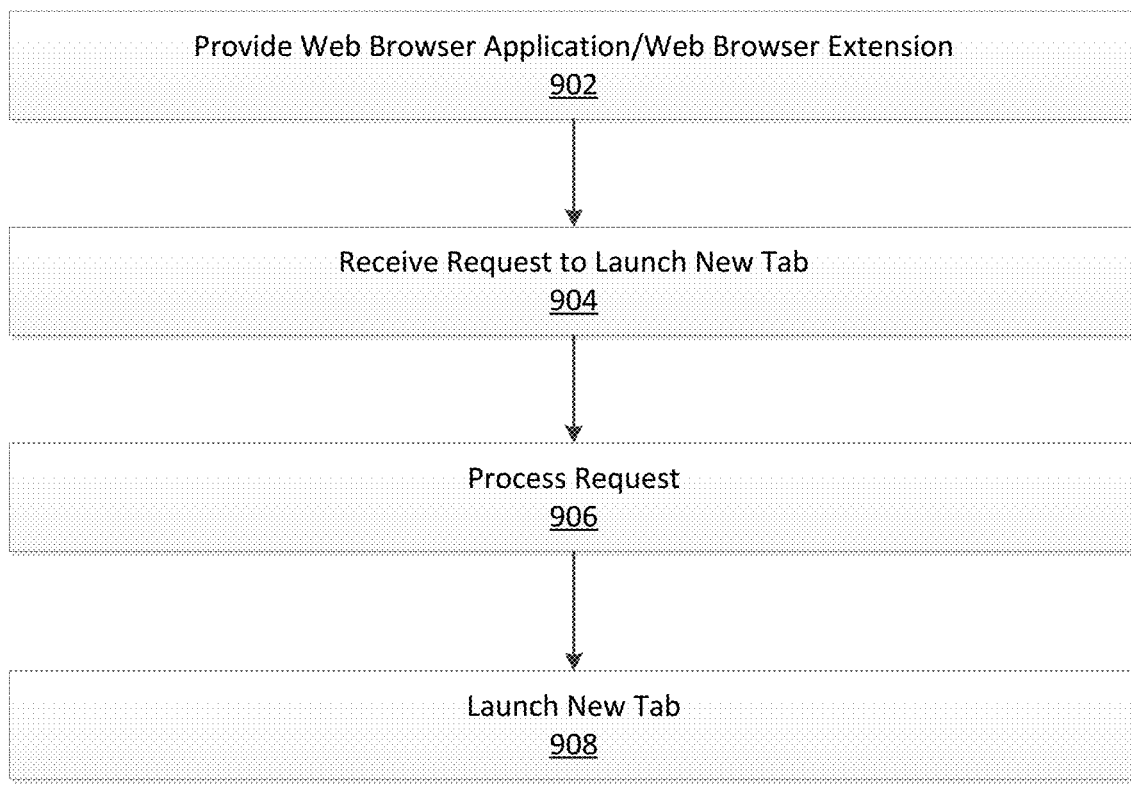

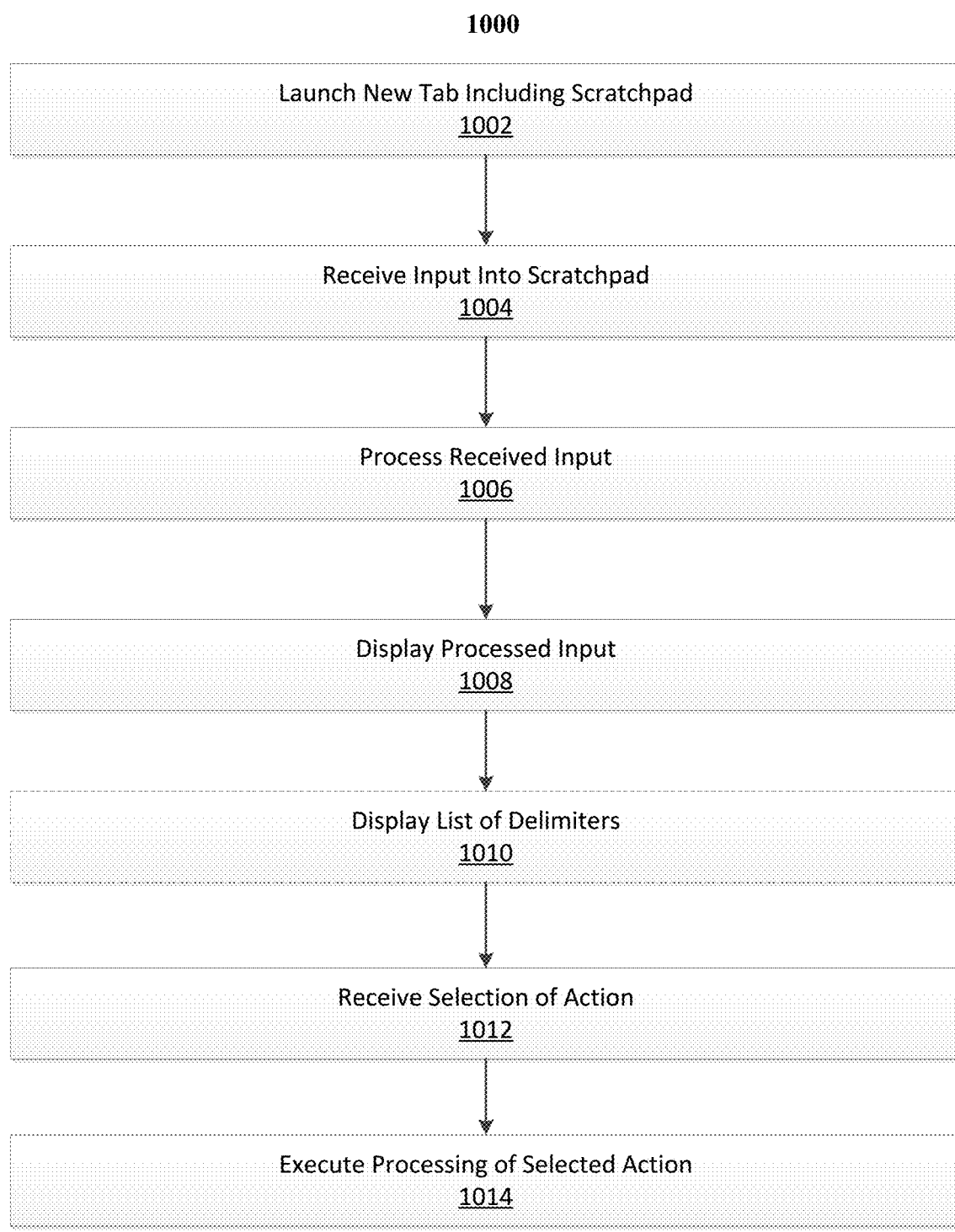

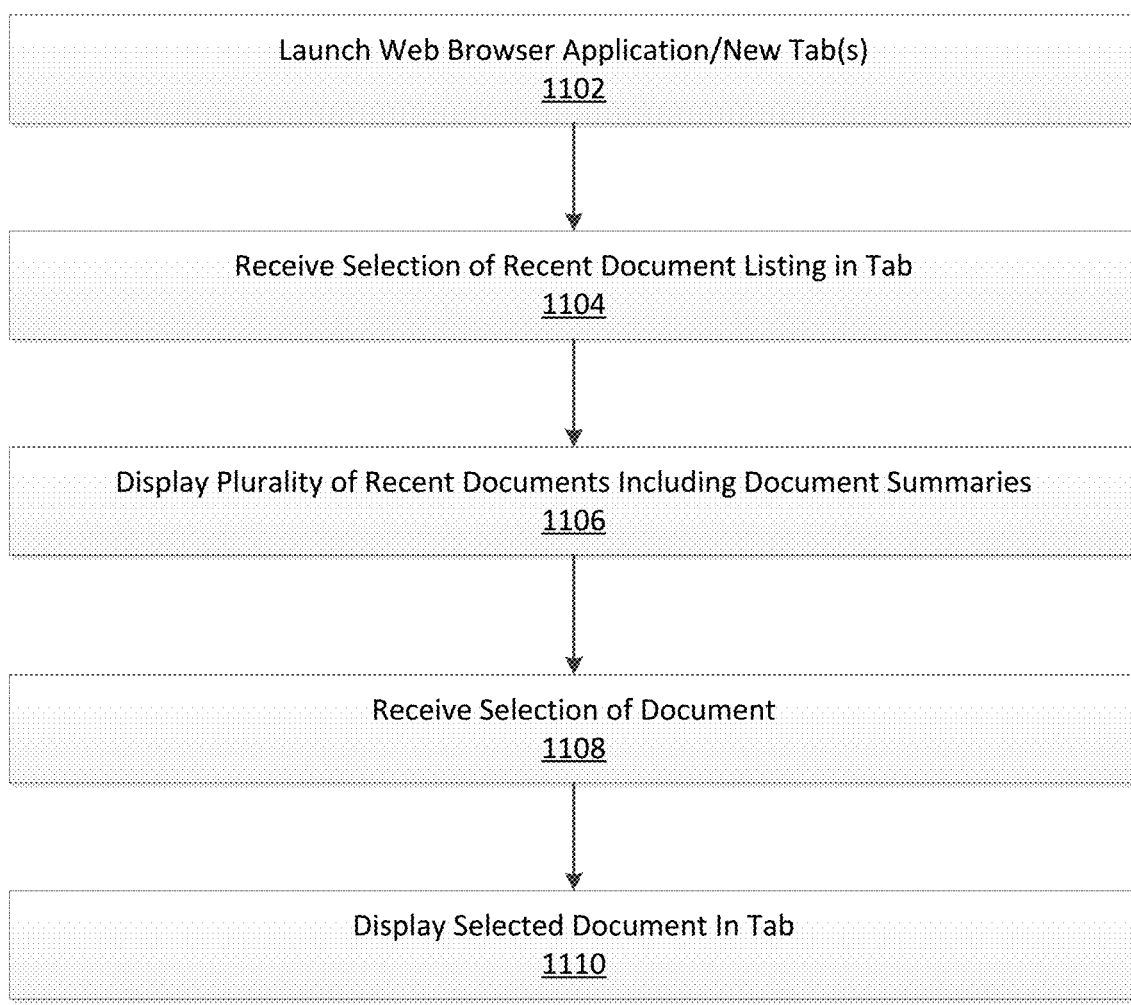

WEB BROWSER EXTENSION

BACKGROUND

Currently, web browser functionality may require numerous steps for a user to be able to locate and access content for resource that is external to a web browser application. A first step may require a user to search for a website that may host desired content. An identified website would then need to be accessed. Desired content would then have to be searched for on the website. Once a user locates the content on the website, the user would have to initiate access to the content. Such a process is tedious for a user and requires a processing device to process numerous requests. Furthermore, it is submitted that functionality of web browser application may be expanded beyond what is initially provided for by the web browser application. As such, it is with respect to the general technical environment of improved processing for devices implementing a web browser application that the present application is directed.

SUMMARY

Non-limiting examples of the present disclosure describe processing via an extension of a web browser application. A processing device, for example, may provide a web browser application that comprises an extension enabling an application service to interface with the web browser application. Input may be received in a uniform resource locator (URL) bar of the web browser application. A search of an application service may be launched directly from the URL bar based on the received input. The processing device may retrieve results from the application based on the searching. The retrieved results may be displayed within the URL bar on a display connected with the processing device.

Other non-limiting examples of the present disclosure describe a web browser extension that enables a processing device to provide added functionality and features efficiently within a web browser application. A web browser application is provided that comprises an extension enabling a plurality of application services to interface with the web browser application. A processing device executing the web browser application may receive a request to launch a new tab in a web browser application. The processing device may process the received request. In response to processing the received request, a new tab is launched within the web browser application on a display connected with the processing device. The new tab may comprise a scratchpad that is a notepad feature that integrates the plurality of application services within the web browser application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4 illustrates an exemplary system implementable on one or more computing devices on which aspects of the present disclosure may be practiced.

FIGS. 5A-7B illustrate exemplary processing device views highlighting processing through an exemplary web browser extension with which aspects of the present disclosure may be practiced.

FIG. 8 is an exemplary method for content search and retrieval utilizing an exemplary web browser extension with which aspects of the present disclosure may be practiced.

FIG. 9 is an exemplary method for launching, utilizing an exemplary web browser extension, a new tab in a web browser application with which aspects of the present disclosure may be practiced.

FIG. 10 is an exemplary method processing that utilizes a web browser extension to process received input into a new tab of a web browser application with which aspects of the present disclosure may be practiced.

FIG. 11 is an exemplary method for content display in a new tab of a web browser application that implements an exemplary web browser extension with which aspects of the present disclosure may be practiced.

DETAILED DESCRIPTION

The present disclosure comprises examples of processing that utilizes functionality provided by a web browser extension. A web browser extension is a collection of processing operations that collectively extend the functionality of a web browser application. The web browser extension may be one or more executable programs, application programming interfaces (APIs), or any other collection of processing operations, functions, routines, protocols, and/or tools for building and executing software applications on a processing device. A web browser application is an application that enables retrieving, presenting, and traversing information resources over the Internet (or distributed network). In at least one example, the web browser extension may be distributed and/or bundled with the web browser application as a single product. An example web browser extension is configured to modify and enhance the web browser application to enable a processing device to connect to a plurality of application services through the web browser application. In examples, the web browser extension may provide functionality including but not limited to: direct searching of content (e.g., content of an application service or content stored locally on a processing device) through a uniform resource locator (URL) bar of the web browser application, direct launching of content within the web browser application, ability to launch new tabs that are customized by the web browser extension, scratchpad functionality in customized tab, ability to provide real-time notifications for content (e.g., updates to content), ability to provide suggestions based on search history, and an ability to recognize received input and provide suggestions/recommendations while work with content, among other examples. An exemplary web browser extension may be integrated within any type of web browser application.

Accordingly, the present disclosure provides a plurality of technical advantages including but not limited to: increased functionality for an executing web browser application, extensibility of web browser applications and processing devices, ability to dynamically scale web browser applications to connect with application services even in cases where application services is not installed locally on a processing device, improved user interaction when executing web browser application on a processing device, more efficient operation of a processing device executing a web browser application (e.g., saving computing cycles/computing resources) improved ability to process received input, ability to provide real-time notifications for content, reduction in memory required for storing application services locally on a processing device, and improved communication between a processing device and application services, among other examples.

Figure 1:
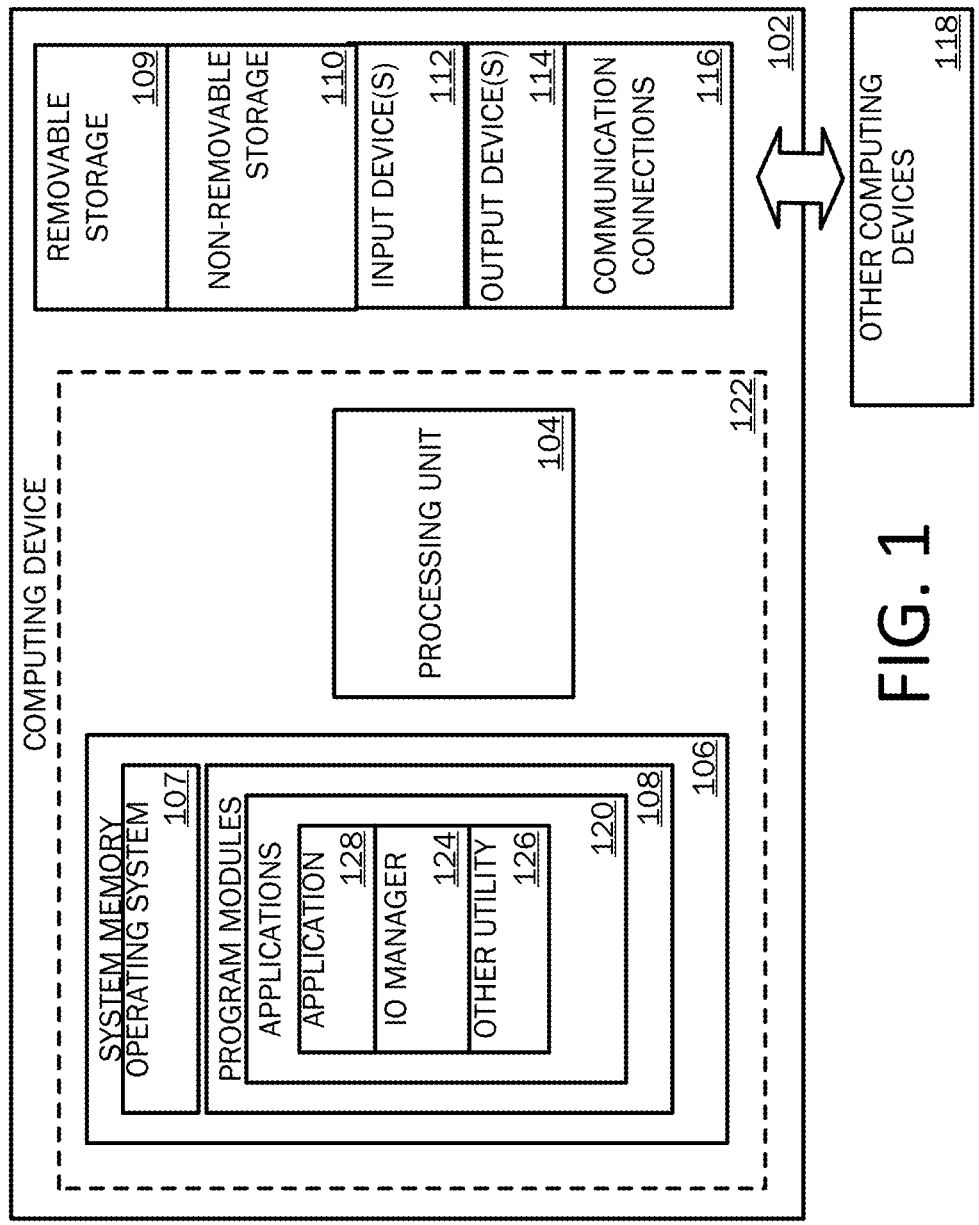
FIG. 1 is a block diagram illustrating an example of a computing device with which aspects of the present disclosure may be practiced.
Figure 2A:
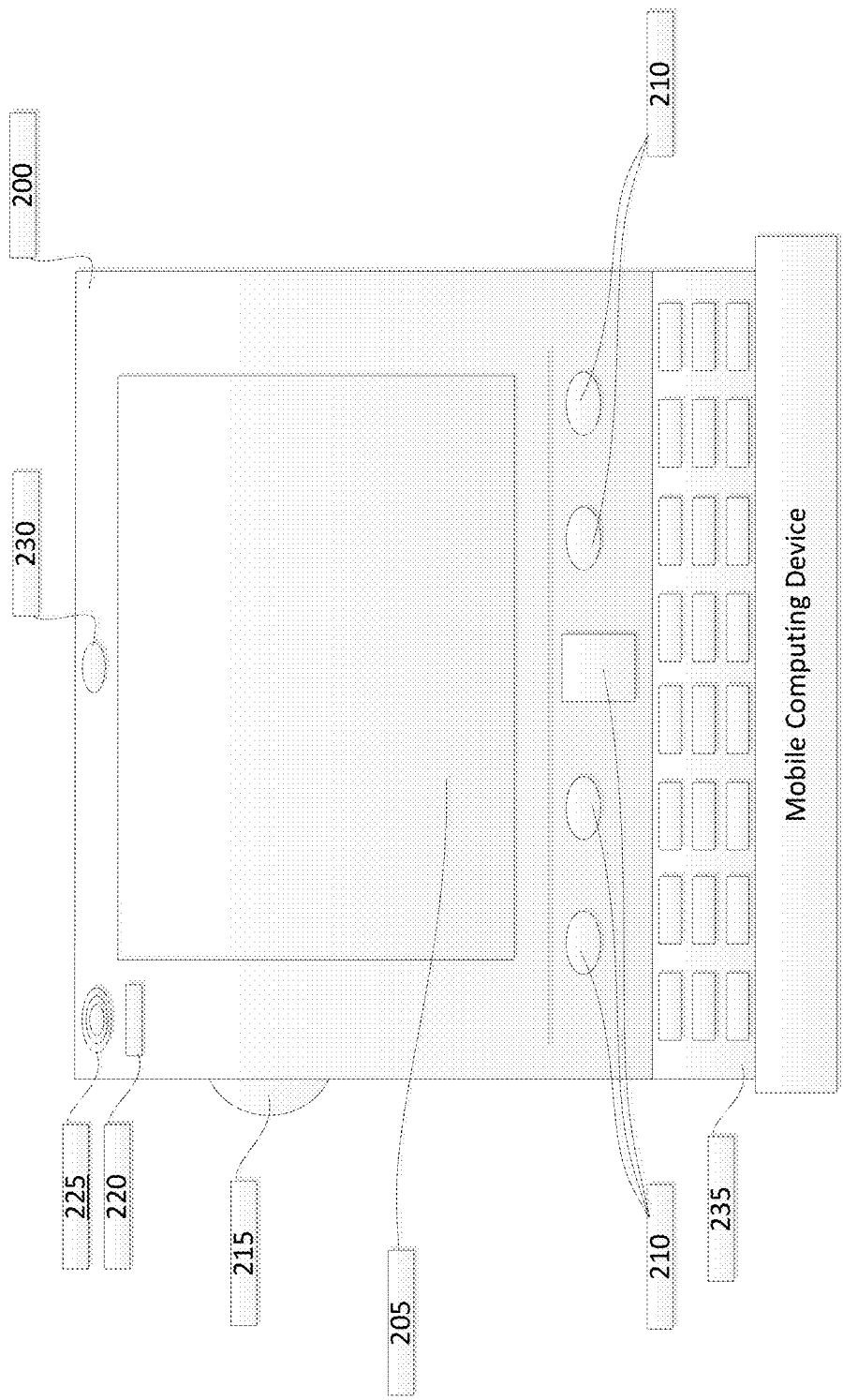
FIGS. 2A and 2B are simplified block diagrams of a mobile computing device with which aspects of the present disclosure may be practiced.
Figure 2B:
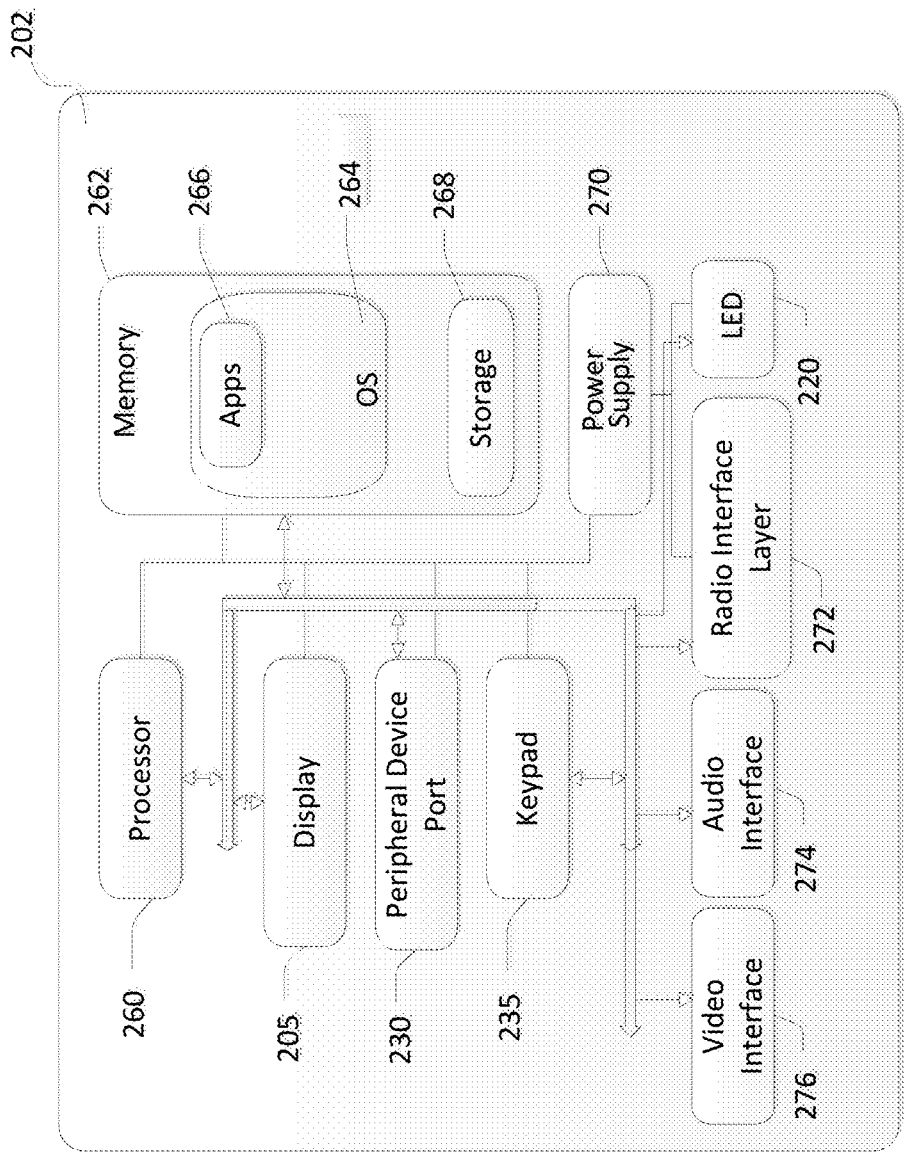
Figure 3:
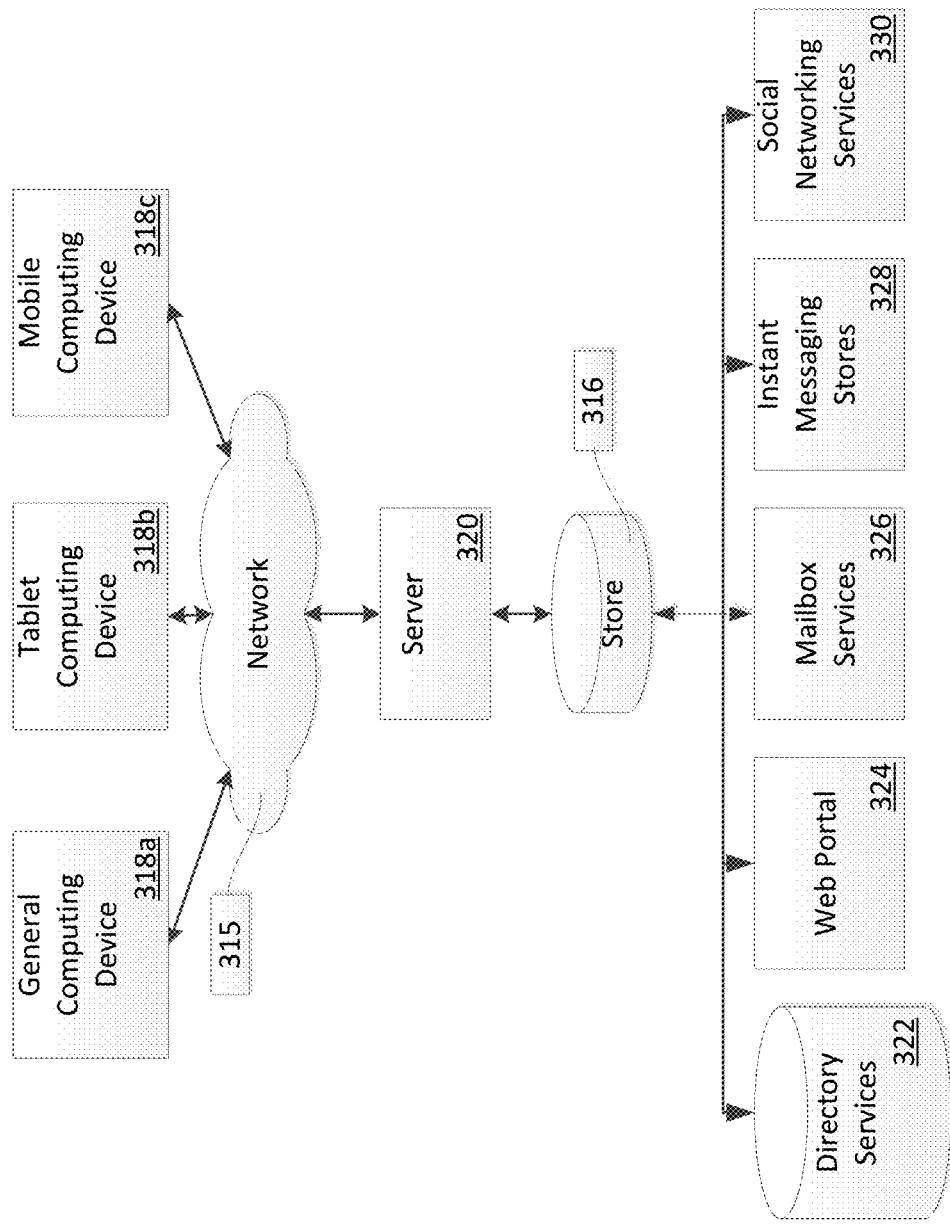
FIG. 3 is a simplified block diagram of a distributed computing system in which aspects of the present disclosure may be practiced.

FIGS. 1-3 and the associated descriptions provide a discussion of a variety of operating environments in which examples of the invention may be practiced. However, the devices and systems illustrated and discussed with respect to FIGS. 1-3 are for purposes of example and illustration and are not limiting of a vast number of computing device configurations that may be utilized for practicing examples of the invention, described herein.

FIG. 1 is a block diagram illustrating physical components of a computing device 102, for example a mobile processing device, with which examples of the present disclosure may be practiced. For example, computing device 102 may be an exemplary computing device for implementation of an exemplary web browser application and web browser extension as described herein. In a basic configuration, the computing device 102 may include at least one processing unit 104 and a system memory 106. Depending on the configuration and type of computing device, the system memory 106 may comprise, but is not limited to, volatile storage (e.g., random access memory), non-volatile storage (e.g., read-only memory), flash memory, or any combination of such memories. The system memory 106 may include an operating system 107 and one or more program modules 108 suitable for running software programs/modules 120 such as IO manager 124, other utility 126 and application 128. As examples, system memory 106 may store instructions for execution. Other examples of system memory 106 may store data associated with applications. The operating system 107, for example, may be suitable for controlling the operation of the computing device 102. Furthermore, examples of the invention may be practiced in conjunction with a graphics library, other operating systems, or any other application program and is not limited to any particular application or system. This basic configuration is illustrated in FIG. 1 by those components within a dashed line 122. The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage device 109 and a non-removable storage device 110.

As stated above, a number of program modules and data files may be stored in the system memory 106. While executing on the processing unit 104, program modules 108 (e.g., Input/Output (I/O) manager 124, other utility 126 and application 128) may perform processes including, but not limited to, one or more of the stages of the operations described throughout this disclosure. Other program modules that may be used in accordance with examples of the present invention may include electronic mail and contacts applications, word processing applications, spreadsheet applications, database applications, slide presentation applications, drawing or computer-aided application programs, photo editing applications, authoring applications, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

The computing device 102 may also have one or more input device(s) 112 such as a keyboard, a mouse, a pen, a sound input device, a device for voice input/recognition, a touch input device, etc. The output device(s) 114 such as a display, speakers, a printer, etc. may also be included. The aforementioned devices are examples and others may be used. The computing device 104 may include one or more communication connections 116 allowing communications with other computing devices 118. Examples of suitable communication connections 116 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 106, the removable storage device 109, and the non-removable storage device 110 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 102. Any such computer storage media may be part of the computing device 102. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 2A and 2B illustrate a mobile computing device 200, for example, a mobile telephone, a smart phone, a personal data assistant, a tablet personal computer, a phablet, a slate, a laptop computer, and the like, with which examples of the invention may be practiced. Mobile computing device 200 may be an exemplary computing device for implementation of an exemplary web browser application and web browser extension as described herein. For example, mobile computing device 200 may be implemented to execute applications and/or application command control. Application command control relates to presentation and control of commands for use with an application through a user interface (UI) or graphical user interface (GUI). In one example, application command controls may be programmed specifically to work with a single application. In other examples, application command controls may be programmed to work across more than one application. With reference to FIG. 2A, one example of a mobile computing device 200 for implementing the examples is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative examples, mobile computing device 200 may incorporate more or less input elements. For example, the display 205 may not be a touch screen in some examples. In yet another alternative example, the mobile computing device 200 is a portable phone system, such as a cellular phone. The mobile computing device 200 may also include an optional keypad 235. Optional keypad 235 may be a physical keypad or a "soft" keypad generated on the touch screen display or any other soft input panel (SIP). In various examples, the output elements include the display 205 for showing a GUI, a visual indicator 220 (e.g., a light emitting diode), and/or an audio transducer 225 (e.g., a speaker). In some examples, the mobile computing device 200 incorporates a vibration transducer for providing the user with tactile feedback. In yet another example, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 2B is a block diagram illustrating the architecture of one example of a mobile computing device. That is, the mobile computing device 200 can incorporate a system (i.e., an architecture) 202 to implement some examples. In one examples, the system 202 is implemented as a "smart phone" capable of running one or more applications (e.g., browser, e-mail, calendaring, contact managers, messaging clients, games, and media clients/players). In some examples, the system 202 is integrated as a computing device, such as an integrated personal digital assistant (PDA), tablet and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268, such as e-mail or other messages used by an e-mail application, and the like. A synchronization application (not shown) also resides on the system 202 and is programmed to interact with a corresponding synchronization application resident on a host computer to keep the information stored in the non-volatile storage area 268 synchronized with corresponding information stored at the host computer. As should be appreciated, other applications may be loaded into the memory 262 and run on the mobile computing device 200 described herein.

The system 202 has a power supply 270, which may be implemented as one or more batteries. The power supply 270 might further include an external power source, such as an AC adapter or a powered docking cradle that supplements or recharges the batteries.

The system 202 may include peripheral device port 230 that performs the function of facilitating connectivity between system 202 and one or more peripheral devices. Transmissions to and from the peripheral device port 230 are conducted under control of the operating system (OS) 264. In other words, communications received by the peripheral device port 230 may be disseminated to the application programs 266 via the operating system 264, and vice versa.

The system 202 may also include a radio interface layer 272 that performs the function of transmitting and receiving radio frequency communications. The radio interface layer 272 facilitates wireless connectivity between the system 202 and the "outside world," via a communications carrier or service provider. Transmissions to and from the radio interface layer 272 are conducted under control of the operating system 264. In other words, communications received by the radio interface layer 272 may be disseminated to the application programs 266 via the operating system 264, and vice versa.

The visual indicator 220 may be used to provide visual notifications, and/or an audio interface 274 may be used for producing audible notifications via the audio transducer 225. In the illustrated example, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 274 is used to provide audible signals to and receive audible signals from the user. For example, in addition to being coupled to the audio transducer 225, the audio interface 274 may also be coupled to a microphone to receive audible input, such as to facilitate a telephone conversation. In accordance with examples of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 2B by the non-volatile storage area 268.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

FIG. 3 illustrates one example of the architecture of a system for providing an application that reliably accesses target data on a storage system and handles communication failures to one or more client devices, as described above. The system of FIG. 3 may be an exemplary system for implementation of an exemplary web browser application and web browser extension as described herein. Target data accessed, interacted with, or edited in association with programming modules 108, applications 120, and storage/memory may be stored in different communication channels or other storage types. For example, various documents may be stored using a directory service 322, a web portal 324, a mailbox service 326, an instant messaging store 328, or a social networking site 330, application 128, IO manager 124, other utility 126, and storage systems may use any of these types of systems or the like for enabling data utilization, as described herein. A server 320 may provide storage system for use by a client operating on general computing device 102 and mobile device(s) 200 through network 315. By way of example, network 315 may comprise the Internet or any other type of local or wide area network, and client nodes may be implemented as a computing device 102 embodied in a personal computer, a tablet computing device, and/or by a mobile computing device 200 (e.g., mobile processing device). Any of these examples of the client computing device 102 or 200 may obtain content from the store 316.

FIG. 4 illustrates an exemplary system 400 implementable on one or more computing devices on which aspects of the present disclosure may be practiced. System 400 may be an exemplary system for implementation of an exemplary web browser application and web browser extension as described herein. Exemplary system 400 presented is a combination of interdependent components that interact to form an integrated whole for learned program generation based on user example operations. Components of system 400 may be hardware components or software implemented on and/or executed by hardware components of system 1300. In examples, system 400 may include any of hardware components (e.g., ASIC, other devices used to execute/run an OS, and software components (e.g., applications, application programming interfaces, modules, virtual machines, runtime libraries) running on hardware. In one example, an exemplary system 400 may provide an environment for software components to run, obey constraints set for operating, and makes use of resources or facilities of the systems/processing devices, where components may be software (e.g., application, program, module) running on one or more processing devices. For instance, software (e.g., applications, operational instructions, modules) may be run on a processing device such as a computer, mobile device (e.g., smartphone/phone, tablet) and/or any other electronic devices. As an example of a processing device operating environment, refer to operating environments of FIGS. 1-3. In other examples, the components of systems disclosed herein may be spread across multiple devices. For instance, input may be entered on a client device (e.g., processing device) and information may be processed or accessed from other devices in a network such as one or more server devices.

One of skill in the art will appreciate that the scale of systems such as system 400 may vary and may include more or fewer components than those described in FIG. 4. In some examples, interfacing between components of the system 400 may occur remotely, for example where components of system 400 may be spread across one or more devices of a distributed network. In examples, one or more data stores/storages or other memory are associated with system 400. For example, a component of system 400 may have one or more data storages/memories/stores associated therewith. Data associated with a component of system 400 may be stored thereon as well as processing operations/instructions executed by a component of system 400. Components of the system 400 may interface with an OS of a processing device perform processing operations related to launching and execution of a web browser application that comprises an exemplary web browser extension. One or more components of system 400 may be used in providing an exemplary web browser extension as a service that can be accessed by one or more entry point through the web browser application. An entry point is a point of entry or platform for communication with the web browser extension such as a device that initiates a communication and/or an application service that communicates with the web browser extension. In examples, an entry point may include but is not limited to: any applications/services including search applications, intelligent personal assistant applications, first-party products/services, second-party products/services, and third-party products/services, among other examples. Application services (e.g., application executing on a processing device/system) are any resource that may interface with the web browser application and web browser extension. Application services may include but are not limited to systems, application/services that may be managed by a same business/organization as the web browser extension as well as resources that are external to a business/organization of the web browser extension. Application services may include resources such as web search services, e-mail applications, calendars, device management services, address book services, informational services, etc.) as well as services and/or websites that are hosted or controlled by third parties. For example, application services may include line-of-business (LOB) management services, customer relationship management (CRM) services, debugging services, accounting services, payroll services, etc. Application services may further include other websites and/or applications hosted by third parties such as social media websites; photo sharing websites; video and music streaming websites; search engine websites; sports, news or entertainment websites, and the like. Services may provide robust reporting, analytics, data compilation and/or storage service, etc., whereas some other services that may be integrated within the web browser application may provide search engines or other access to data and information, images, videos, and the like.

Further, components of system 400 may possess processing means and may be configured to handle any type of input including but not limited to speech/voice input, text input, gesture input, handwritten input, among other examples. System 400 may be scalable and configurable to operate on a variety of processing devices including but not limited to: desktop computers, laptop computers, mobile processing devices such as phones, tablets, slates, wearable processing devices (e.g., watches, glasses, earpieces), vehicular processing devices, and any other devices having at least one processor, among other examples. Exemplary system 400 comprises application components 406 including a user interface component 408, an input recognition component 410, and a web browser extension component 412, where each of the identified components may comprise one or more additional components.

System 400 may further comprise one or more storages 414 that may store data associated with operation of one or more components of system 400. Storages 414 are any physical or virtual memory space. Storages 414 may store any data for processing operations performed by components of system 400, retained data from processing operations, training data, modeling data for execution of processing operations, and knowledge data among other examples. Furthermore, in examples, components of system 400 may utilize knowledge data in processing by components of system 400. Knowledge data is any data that is usable by a component of system 400 to improve processing of any of the application components 406 where knowledge data can be obtained from resources internal or external to system 400. In examples, knowledge data may be maintained in storage(s) 414 or retrieved from one or more resources external to system 400 by knowledge fetch operation. As an example, application services that may be accessed by an exemplary web browser extension may be considered knowledge data that may be stored locally or accessed over a distributed network.

In FIG. 4, processing device 402 may be any device comprising at least one processor and at least one memory/storage. Examples of processing device 402 may include but are not limited to: processing devices such as desktop computers, servers, phones, tablets, phablets, slates, laptops, watches, and any other collection of electrical components such as devices having one or more processors or circuits. In one example processing device 402 may be a device of a user that is executing the web browser application and the web browser extension. In examples, processing device 402 may communicate with the application components 406 via a network 404. In one aspect, network 404 is a distributed computing network, such as the Internet. Application services may communicate with application components 406 via the network 404.

The application components 406 are a collection of components that are used to launch and manage a web browser application. The web browser may comprise an exemplary web browser extension or alternatively may interface with an exemplary web browser extension that is executing in association with the web browser application. Application components 406 may comprise a user interface component 408, an input recognition component 410, and a web browser extension component 412. In alternative examples, one or more additional components may be created to manage operations described throughout the present disclosure. Application components 406 may be stored on one or more processing devices (e.g., client device) or access to one or more of the application components 406 may be distributed, for example through a distributed network.

The user interface component 408 is one or more components that are configured to enable interaction with a user of a processing device when executing a web browser application. In examples, the user interface component 408 may be configured to enable a processing device to access functionality associated with an exemplary web browser extension that may be implemented within a web browser application. Transparency and organization are brought to users of a processing device through the user interface component 408 where a user can interact with the web browser application through user interface elements that include functionality provided by a web browser extension. As an example, the user interface component 408 may comprise generation and display of one or more user interface elements upon a display of a processing device. The user interface component 408 may further execute as a front-end for display (e.g., graphical user interface) of back-end processing performed by the other application components 406. In examples, user interface definition files may be used to define user interface elements for fostering interaction between a processing device and a web browser application that is configured with an exemplary web browser extension. User interface definition files may comprise programming instructions or operations for management and display of user interface elements associated with user interface component 408.

Input recognition component 410 is a component of the system 400 that receives, processes and tags a received input for recognition. When input is received, for example via the user interface component 408, the input is transmitted to the input recognition component 410 for processing. As examples described above, inputs processed by the input recognition component 410 include but are not limited to speech/voice input (e.g., utterances), text input, gesture input and handwritten input, among other examples.

In examples, the input recognition component 410 may be configured to perform processing operations that evaluate and tag/annotate a received input with data that may be useful for the web browser extension to evaluate for further processing. As an example, signals evaluated by the input recognition component 410 may comprise user context signals. User context signals are any type of signal data that can be used to gather information that can be used to evaluate a received input. Examples of user context signals (or alternatively, user context based query level signals) take into account a user, user location, user language data, form-factor of a user device, time data, entry point data (e.g., an application that an input was entered through), and/or personalization as context, among other examples. Obtaining such a diverse group of signal data may provide technical benefits, for example, where a system/service is able to best evaluate a context of a received input in order to improve a user interaction when using a web browser application. Exemplary user context signal data that may be collected and evaluated may comprise but is not limited to:

User Data: Any data identifying a user that initiated an input. User data may further comprise user location data such as latitude and longitude of the user when an input is issued.

Language Data: Data indicating languages associated with a user such as language of OS, applications, etc. or preferred language for retrieval of a results data, among other examples.

Location Data: Data that may be used to identify any location data from an input or processing device associated with a received input.

Form Factor Data: Data that identifies a device type associated with an input, application or system. As an example, such data may be important because intent of an input may be very different based on the device upon which a query is initiated (e.g., desktop versus mobile); alternatively or additionally, a user intent/desire to obtain result data in a particular form/format may be different based on the device used (e.g., mobile version of an application/service).

Entry Point Data: Data that indicates the entry point that issued the input/query. For instance, entry point data is signal data that identifies whether an input is initiated from a search application, an intelligent personal assistant, a word processing application, a calendar application, etc.

Application Execution Data: Data indicating applications that are executing on a processing device/system. Can include data indicating detection of one or more applications that may be executing/running on the processing device or system.

Time Data: Data that provides temporal dimensions associated with a received input. For instance, timestamp data may be used to evaluate relevance of result data to intent of a received input.

Personalization/Context data: Data such as location and/or language preference settings of the user of a device or application (e.g., browser, search engine). Also may consider context data of user with respect to previous queries of the user, other threads, users involved in threads, other executing applications/services, domain types, preferences, etc.

In examples, the input recognition component 410 may acquire data for user context signals and process the input to generate annotated data that can be passed to a processing device or application service. The annotated data may be passed to other components of system 400 such as the web browser extension component 412 for further processing. As an example, processing of the received input may be passed to the extension component 412 to communicate the received input and user context signals associated with the received input to an application service to best evaluate results data. For example, a user identity and a context of a search can be passed to an application service to retrieve results associated with a search of a user who is utilizing the web browser application. Processing operations for collecting such user context signal data may be known to one skilled in the art. In examples, such processing operations may comprise one or more computer-executable instructions/programming operations, application programming interfaces (APIs), machine learning processing, and any other type of programming application or service that can extract and annotate user context signal data. One skilled in the art should also recognize that data, for evaluation of input/query signal data such as user context signals, is collected while respecting privacy laws protecting users.

The web browser component 412 is a component configured to launch, execute and manage the web browser application during execution on a processing device such as processing device 402. As identified above, the web browser application is an application that enables retrieving, presenting, and traversing information resources over the Internet (or distributed network). The web browser application may be one or more executable programs, application programming interfaces (APIs), or any other collection of processing operations, functions, routines, protocols, and/or tools for building and executing software applications on a processing device. In at least one example, the web browser extension (e.g. provided through the extension component 412) may be distributed and/or bundled with the web browser application as a single product. A web browser interfaces with one or more other components of system 400 including the extension component 412, which enables the web browser application to offer added functionality to a user of the web browser application. The Web browser enables a processing device to provide a specific web browsing experience for a user of a processing device. In doing so, the web browser may manage interaction between one or more processing devices with web browser application, wherein management comprises but is not limited to: launching of the web browser application, display and graphical user interface of the web browser application, input recognition processing for features/functionality that are configured within the web browser application, search query processing, web browsing processing, finding and notification, bookmark and history management, web browsing history management, tab/window management, web browser application settings, and interfacing with web browser extensions and/or application services, among other examples.

The extension component 412 is a component configured to extend the functionality of a web browser application. The web browser extension may be one or more executable programs, application programming interfaces (APIs), or any other collection of processing operations, functions, routines, protocols, and/or tools for building and executing software applications on a processing device. The extension component 412 may be configurable to provide added functionality to the web browser application providing a tailored experience for a user of the web browser application as well as to improve processing operation efficiency of a processing device, among other examples. In examples, the extension component 412 may provide functionality for the web browser application including but not limited to: direct searching of content (e.g., content of an application service or content stored locally on a processing device) through a uniform resource locator (URL) bar of the web browser application, direct launching of content within the web browser application, ability to launch new tabs that are customized by the web browser extension, scratchpad functionality in customized tab, ability to provide real-time notifications for content (e.g., updates to content), ability to provide suggestions based on search history, and an ability to recognize received input and provide suggestions/recommendations while work with content, among other examples. Examples of functionality/extensibility provided by a web browser extension (e.g., implemented through extension component 412) are further detailed in the description of FIGS. 5A-11. The extension component 412 may interface with the web browser to enable the web browser application to integrate and offer added functionality that may not be present in a standalone web browser application. An exemplary web browser extension may be integrated within any type of web browser application.

Extension component 412 may further interface with other components of system 400 including the user interface component 408 and the input recognition component 410 to receive and process received input. Moreover, the extension component 412 may be configured to communicate with external resources such as application services and integrate such application services within the web browser application. In one example, integration of application services may comprise listening for a received input into a web browser application, processing the received input, transmitting the received input to one or more application services for processing, and returning results retrieved from the one or more application services. Extension component 412 may be further configured to interface with a processing device such as processing device 402. For instance, the extension component 412 may be utilized to search for content locally on processing device 402 or, alternatively, content that is connected with processing device 402 over a distributed network. Content may any kind of stored data and includes but is not limited to portions of text/audio/video, files, documents, and links, among other examples.

FIGS. 5A-7B illustrate exemplary processing device views highlighting processing through an exemplary web browser extension with which aspects of the present disclosure may be practiced. The processing device views highlighted in FIGS. 5A-7B are examples of processing interactions by a processing device that are triggered by a web browser extension configured to interface with a web browser application. For instance, receipt of input or selection of a user interface element within the web browser application may trigger the web browser extension to communicate with a processing device to update display of the web browser application. Processing associated with processing devices views illustrated in FIGS. 5A-7B may be executed by an exemplary processing device and/or system such as those shown in FIGS. 1-4.

Figure 5B:
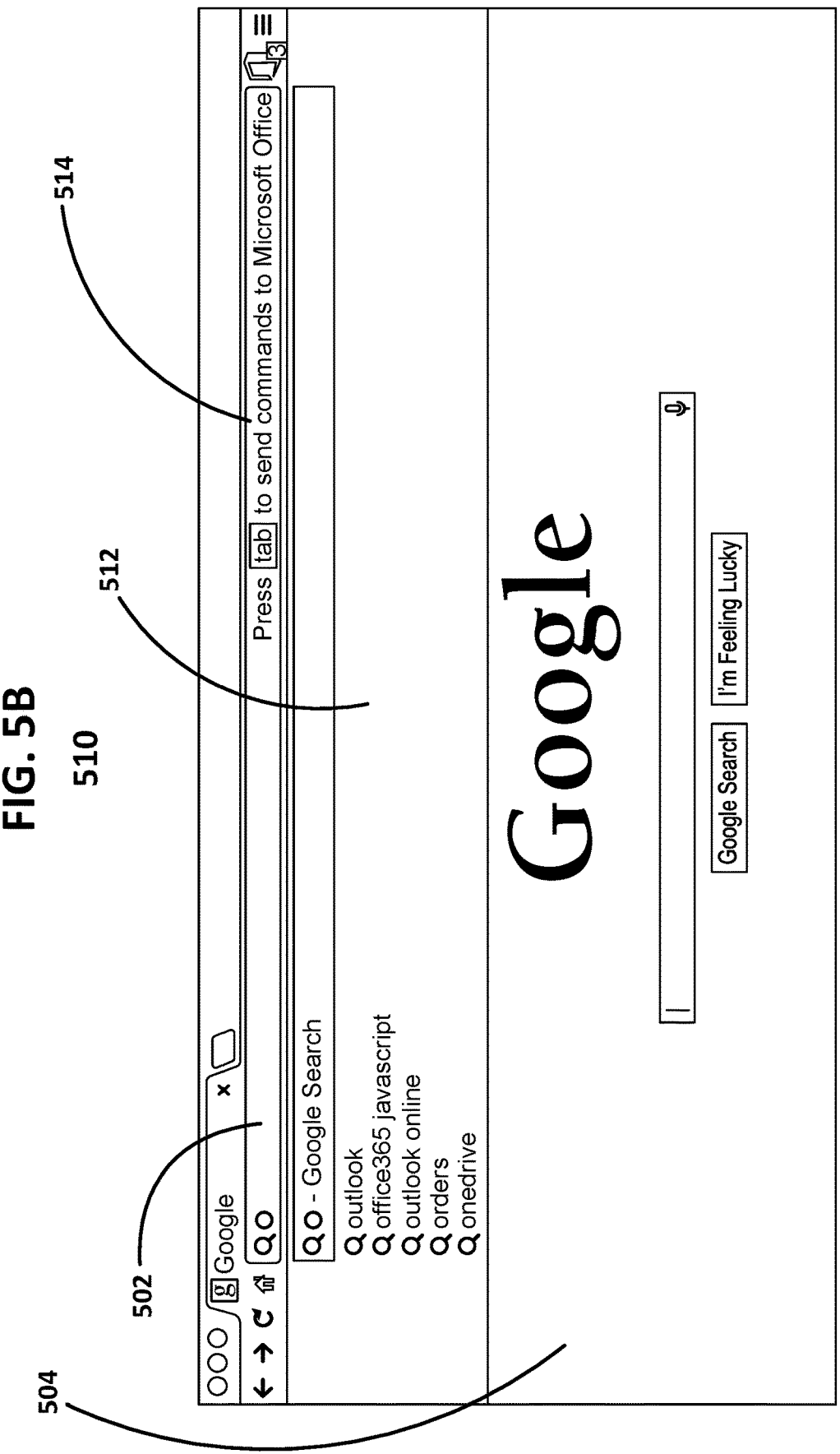

FIG. 5A illustrates processing device view 500 highlighting display of a tab of a web browser application. As an example, when a web browser application is launched, a tab of the web browser application may display a URL bar 502. The URL bar 502 is a graphical control element address bar that shows a current URL of a web page that is displayed in a browser window 504 of the web browser application. The URL bar 502 may accept received input and navigate the browser window 504 to a chosen website in the web browser application. In at least one example, the URL bar 502 may be further configured to act as a file browser to navigate a file-system hierarchy that may be stored locally on a processing device or stored remotely over a distributed network. The URL bar 502 may comprise a plurality of graphical user interface elements including but not limited to: graphical control elements to control navigation of web pages within the browser window 504, homepage settings of the web browser application, viewing properties of the browser window 504, bookmarks/history, control settings, and web browser extensions, among other examples. One skilled in the art should recognize that an exemplary URL bar 502 may include more or fewer features than are listed as features and controls of the URL bar 502 may vary based on the type of web browser application that is being executed. An exemplary web browser extension (as previously described) may interface with a web browser application to provide added functionality to the URL bar 502. Some examples of such added functionality is illustrated in FIGS. 5B-5F of the present disclosure.

As shown in FIG. 5A, application of the web browser extension may cause the URL bar 502 to comprise a content notification icon 506. The content notification icon 506 may provide real-time updates to content associated with one or more application services or content stored locally on a processing device upon which the web browser application is executing. An example of an expanded view of the content notification icon 506 is shown in FIG. 5F.

FIG. 5B illustrates processing device view 510 highlighting an example of added functionality provided to the URL bar 502 by an exemplary web browser extension. As shown in processing device view 510, input can be received in the URL bar 502, where an input of "O" is entered. In response to the received input, the web browser extension may execute processing to evaluate the received input. The web browser extension may be configured to listen for received input (including multiple passes of received input that may update a displayed input in the URL bar 502). In doing so, the web browser extension may employ event processing operations that can listen for and process received input. As an example, a user may wish to search for content on distributed application services, for example, a file stored on storage of a distributed network. In such an example, a processing device would be required to execute numerous steps to locate and access desired content. A first step may require a search for a website associated with an application service that may host such desired content. Once a website is identified, the website would need to be accessed. Content would then have to be searched for and located on a website associated with the application service. Once the content is located, content can then be accessed by the web browser application. Processing device view 510 illustrates integration of the web browser extension that may enable a user to search for (and, via the processing device, to directly access) content directly from input received into the URL bar 502 of the web browser application, thus removing the need for processing device to execute the numerous steps identified above to locate and display desired content, for example.

Processing device view 510 provides display of processed results in response to processing of a received input of "O." As shown in processing device view 510, results from event processing of the received input may be displayed in a drop down menu 512 of the URL bar 502. Drop down menu 512 is a graphical control element that presents a listing of one or more values for a user to choose from and allows the user to choose a value from the listing. As an example, the drop down menu 512 may be used as an auto-complete feature where results data that comprises a portion of the received input is displayed. A user may select a result from the drop down menu 512 to auto-complete entry of input into the URL bar 502. One skilled in the art should recognize that drop down menu 512 is just one example of a graphical control element that may be utilized by the web browser application and web browser extension. Presentation of a graphical control element that performs functionality similar to the drop down menu 512 may vary. Retrieved results displayed in the drop down menu 512 may be retrieved from any of a number of resources including but not limited to: one or more application services associated with the web browser extension, a URL history within the web browser application, and content stored locally on a processing device executing the web browser application.

As shown in processing device view 510, receipt of an input may trigger an updated display of the URL bar 502, where a delimiter prompt 514 is displayed within the URL bar 502. The delimiter prompt 514 may be used to indicate one or more delimiters that can be used to provide added functionality through integration of the web browser extension with the web browser application. A delimiter may be a trigger for specific command processing by the web browser extension. For example, a delimiter such as pressing of the "tab" key (Or a combination of key presses as the delimiter; ex. pressing "O" and then pressing "tab, among other examples) may trigger direct access to an application service where a user can search the application service directly from the URL bar 502. Triggering of a delimiter may occur in any form including but not limited to: a keystroke, a touch input, a voice input, a handwritten input and selection of a delimiter using one or more processing devices, among other examples. A number of delimiters may be pre-defined by the web browser extension, for example where the web browser extension may recognize a plurality of different predefined delimiters. Further, delimiters may be user-defined (e.g., by repeated user input) or defined by other applications/services such as third-party application services. Moreover, in some examples, delimiters employed by the web may be searchable within the web browser application. For instance, identification of one or more delimiters may be provided within the URL bar 502. In examples, the web browser application may integrate with a plurality of web browser extensions. A plurality of web browser extensions may be executing in a launched web browser application where each of the web browser applications may be associated with one or more delimiters. That is, in some examples, web browser extensions may be tailored to a particular functionality, where one more delimiters may be used to access such functionality provided by an application service. In other examples, functionality provided through delimiters may not be part of a URL bar. In such an example, once a delimiter trigger is invoked, key strokes after that will be essentially a "query" to a service external to the web browser application. Once a response is received from a service, the relevant response is injected & added into the URL bar's search results that are displayed below an input field of the URL bar.

Figure 5C:
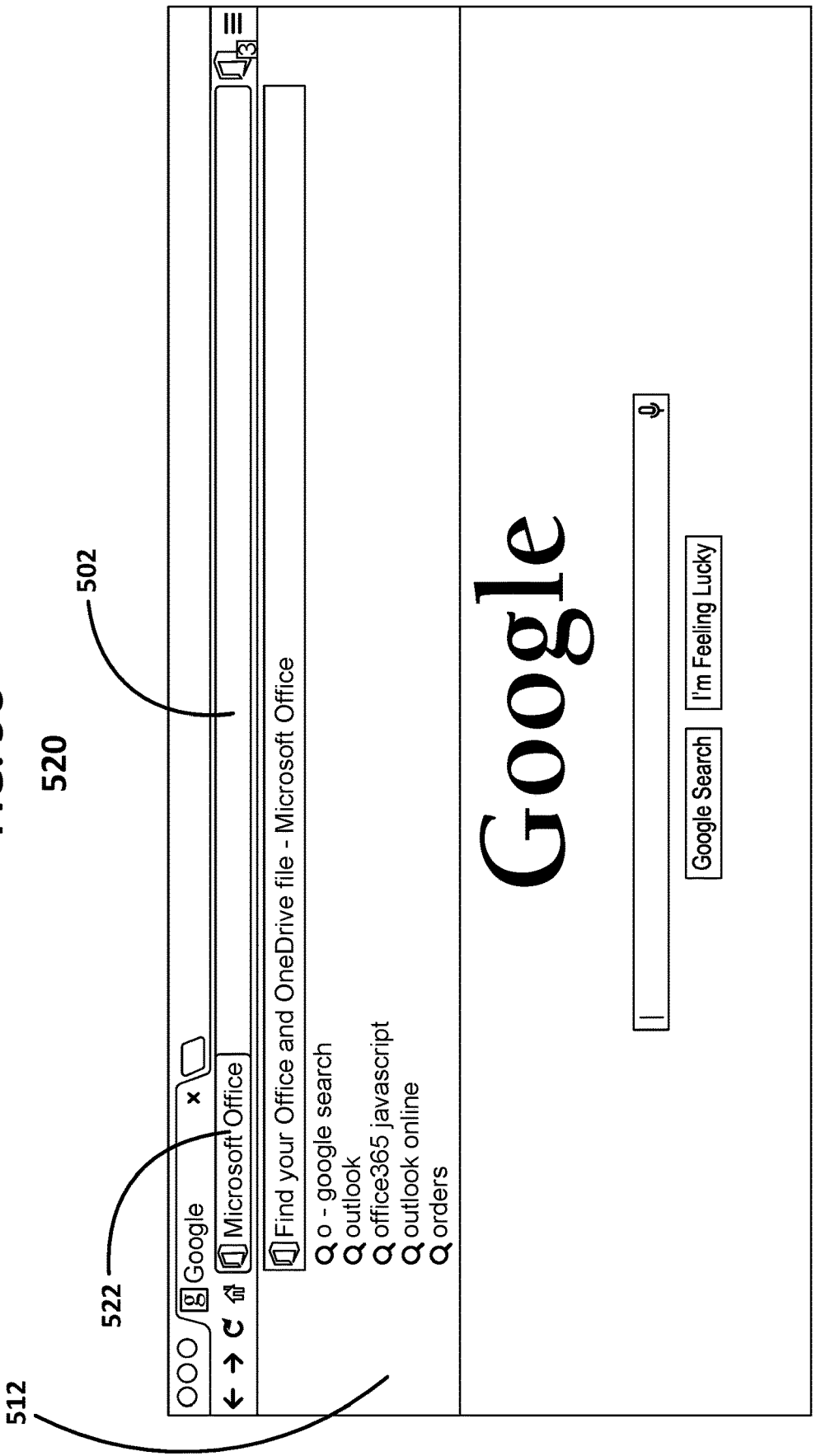

FIG. 5C illustrates processing device view 520 which provides display of processed results in response to processing to selection of a delimiter triggering implementation of a functionality of the web browser extension. For instance, a delimiter of "tab" key (as shown in processing device view 510) may be selected. In response, the URL bar 502 is updated, where an application service icon 522 is displayed within the URL bar 502. In some examples, the application service icon 522 may be selectable and modified to toggle between a plurality of application services associated with the web browser extension. As can be seen in processing device view 520, the drop down menu 512 of the URL bar 502 is updated based on selection of a delimiter.

Figure 5D:
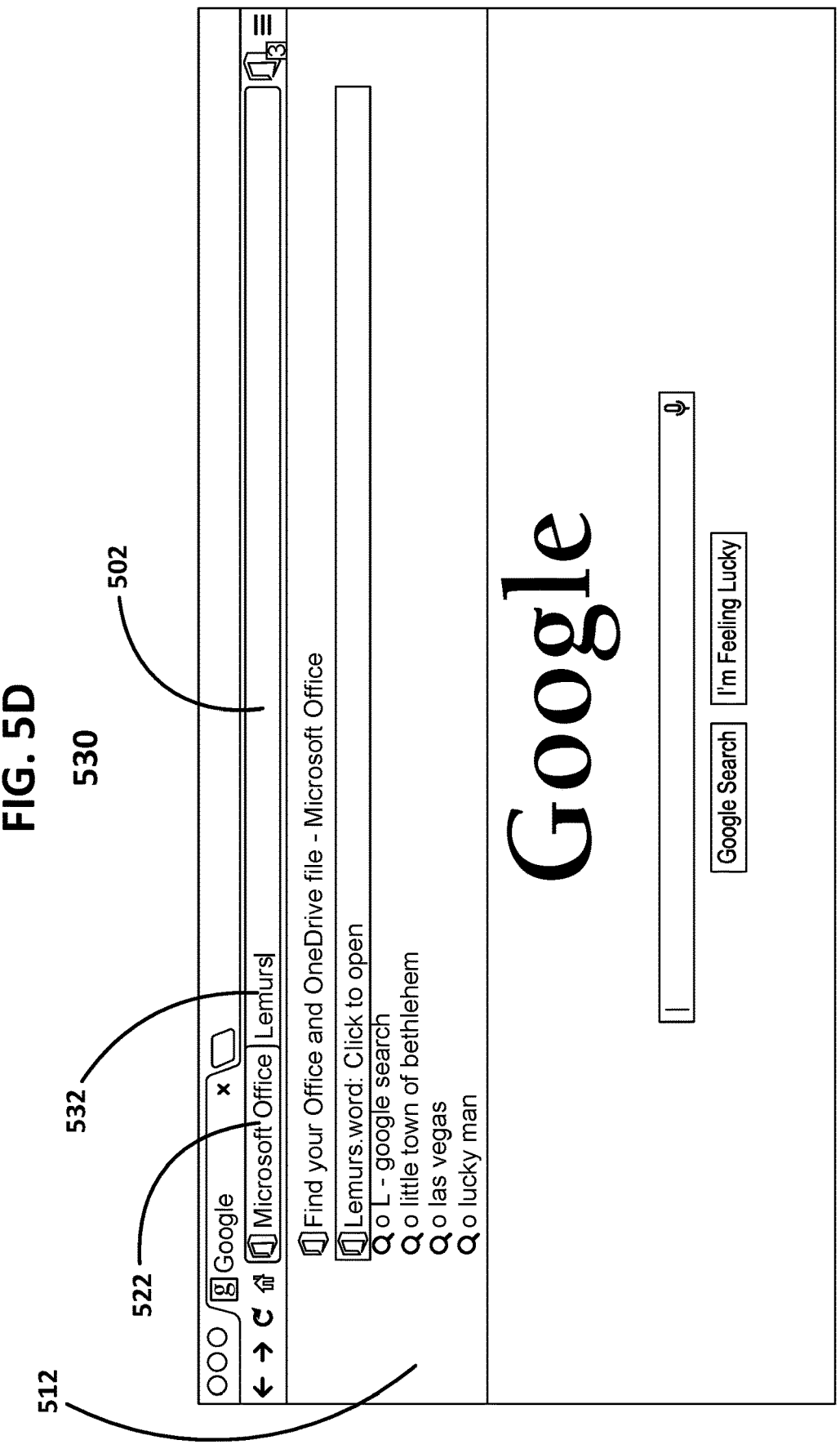

FIG. 5D illustrates processing device view 530 which provides display of processed results in response to update of a received input 532 within the URL bar 502. A received input 532 of "Lemurs" is being entered into the URL bar 502. As can be seen in processing device view 530, the drop down menu 512 of the URL bar 502 is updated based on the received input 532. The web browser extension may utilize event processing to listen for any updates to the received input. As the received input 532 changes the URL bar 502 may dynamically update to display updated results, for example, in the drop down menu 512.

Figure 5E:
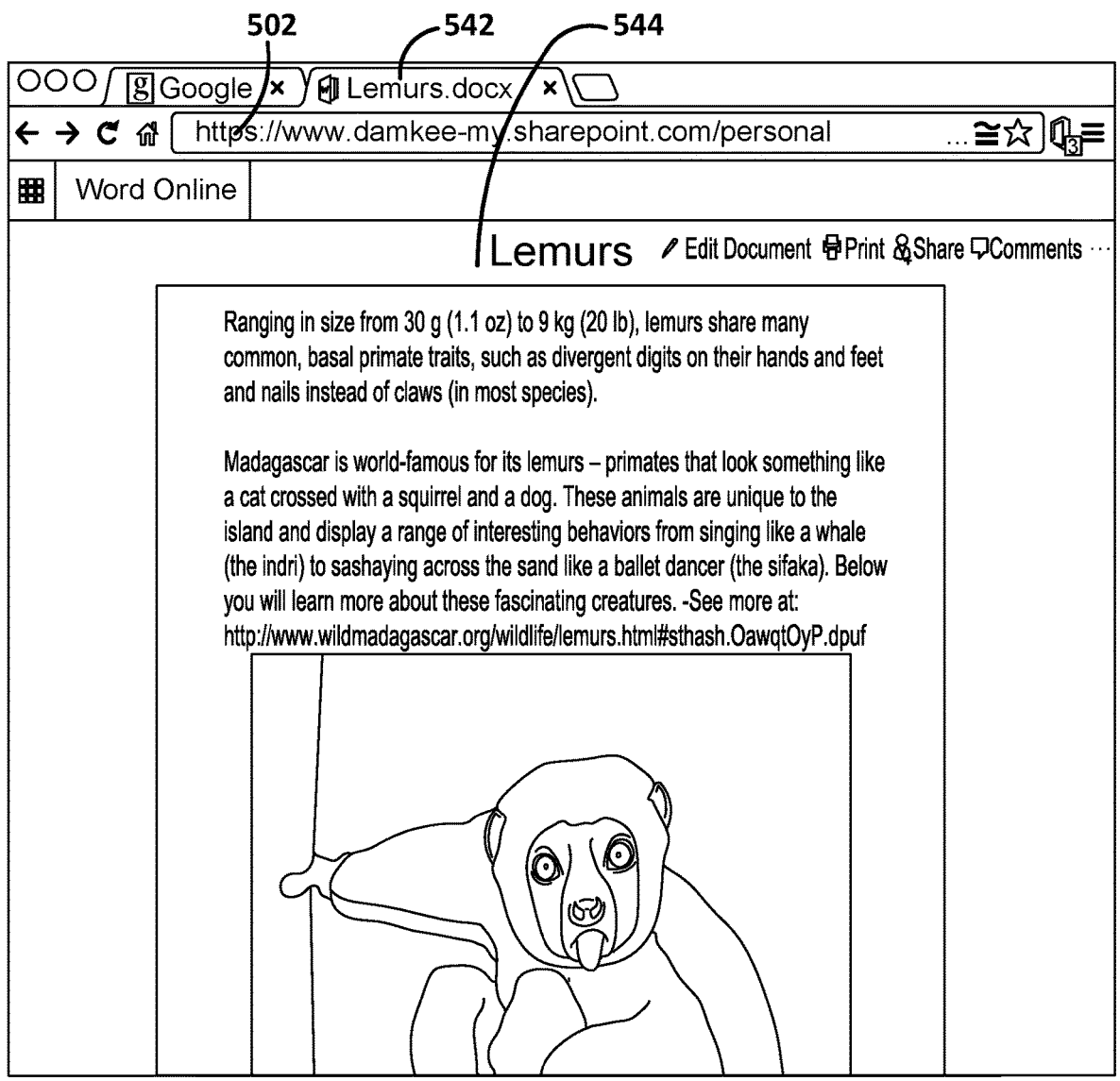

FIG. 5E illustrates processing device view 540 which provides display of content in response to selection of a retrieved result from the URL bar 502. For example, as shown in processing device view 530, a received input 532 of "Lemurs" triggered a result listing in the drop down menu 512 to include a Lemur document. Processing device view 540 illustrates a result of selection of the Lemur document. In one example, a selection of the Lemur document triggers launching of a new tab 542. In the new tab 542, a browser window 544 may directly display the Lemur document that resulted from selection of the link within the drop down menu 512 in processing device view 530. The web browser application may enable a user to toggle between multiple launched tabs. The web browser extension may further provide the browser window 544 with added functionality (e.g., editing, printing, sharing, commenting) of the application service with respect to the launched document. In an alternative example, a browser window 504 (that was currently being utilized) may be updated to include display of the Lemur document, which may be retrieved from an application service.

FIG. 5F illustrates processing device view 550 which provides display of an expanded notification icon 552 within the URL bar 502. As shown in FIG. 5A, application of the web browser extension may cause the URL bar 502 to comprise a content notification icon 506. The content notification icon 506 may provide real-time updates to content associated with one or more application services or content stored locally on a processing device upon which the web browser application is executing. An example of an expanded view 552 of the content notification icon 506 is shown in FIG. 5F. The web browser extension provides the web browser application with the added functionality to detail update notifications regarding content (e.g., content of one or more application services associated with the web browser extension or stored locally on a processing device). Further, the expanded notification icon 552 may enable a user to toggle between different application services and update notifications.

FIG. 6A illustrates processing device view 600 which provides display of a launched new tab 602 in an exemplary web browser application. In one example, execution of the web browser extension within the web browser application may trigger display of tab 602 in response to a request to launch the web browser application. In another example, a user of the web browser application may be viewing a first tab. In response to execution of a command that requests launch of a new tab, new tab 602 may be launched within the web browser application. An exemplary web browser application may be configured to customize the launch of a new tab 602 within the web browser application, providing added functionality that may not be present in the web browser application without execution of the web browser extension. The new tab 602 may comprise a first application window 604 that displays a list of functionalities/features that are accessible through the web browser extension. For example, first application window 604 may include but is not limited to: display of application services extensibility provided by the web browser extension, a scratchpad, links to recent documents, user information, and a search functionality, among other examples.

The new tab 602 may further comprise a second application window 606 that initially launches a scratchpad functionality that is accessible directly in the web browser application. The scratchpad is a notepad integrates a plurality of application services within the web browser application. The scratchpad functionality enables a user is able to jot down thoughts, insert content, create links, create documents, launch content from application services, share data, create communication threads with one or more other users, and otherwise management content inserted into or created within the scratchpad, among other examples. Within the second application window 606, the scratchpad functionality provides control features 608, which are user interface elements that enable control over content entered or inserted into the scratchpad (application window 606). The control features 608 may be modifiable, for example, by developers of the web browser extension and/or users of the web browser application.

Figure 6B:
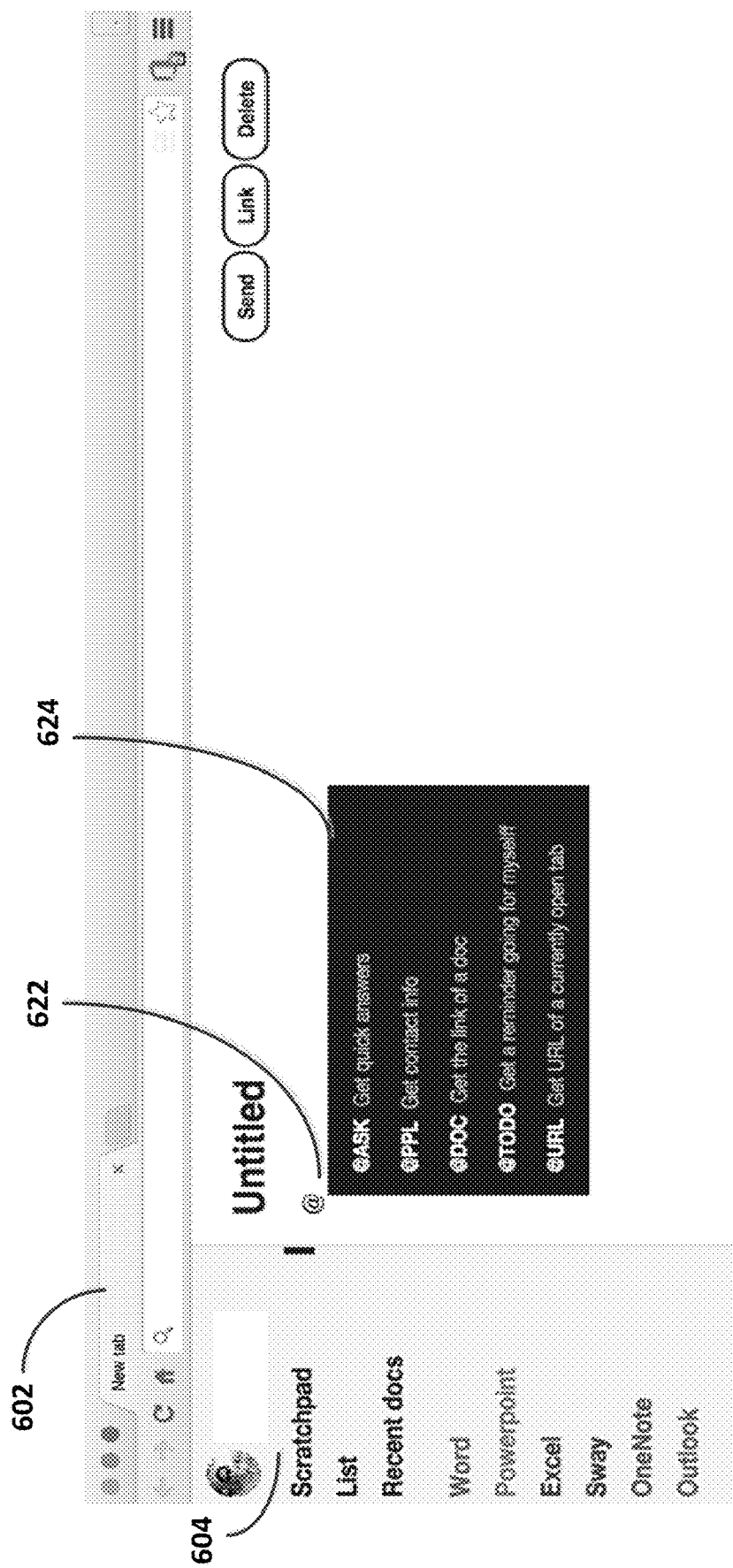

FIG. 6B illustrates processing device view 620 which provides display of an input received into the scratchpad of the displayed new tab 602. As shown in processing device view 620, an input 622 is received into the scratchpad. As an example, the input may be a delimiter (as previously described) that is recognized by the web browser extension. In one example, the delimiter may be more than one character and thus the input 622 that is received is merely a portion of the delimiter. The web browser extension may provide the functionality to display a listing of delimiters 624 for the user to select an intended delimiter. In examples, the listing of delimiters 624 may be searchable.

As an example, a user may enter into an input field of the scratchpad an input of: "I am at" including a contextual delimiter of "[location]." The web browser extension may execute event processing to detect this input and utilize processing operations to identify a location where the processing device/user is located at, for example "Building 22" in New York City. This may be accomplished through communication with an application service that is external to the web browser application, for example, a location service. As an example, the web browser extension is configured to autocomplete the received input to insert a location of the processing device to complete the received input in the scratchpad. Furthermore, in one example, display of the scratchpad may be updated to include content associated with processing of a received input/delimiter. For example, a user may enter an input of: "I am free at [next available free times]." The web browser extension may process the received input and provide display of a few next available free times, for example, for insertion to complete the received input.

Figure 6C:
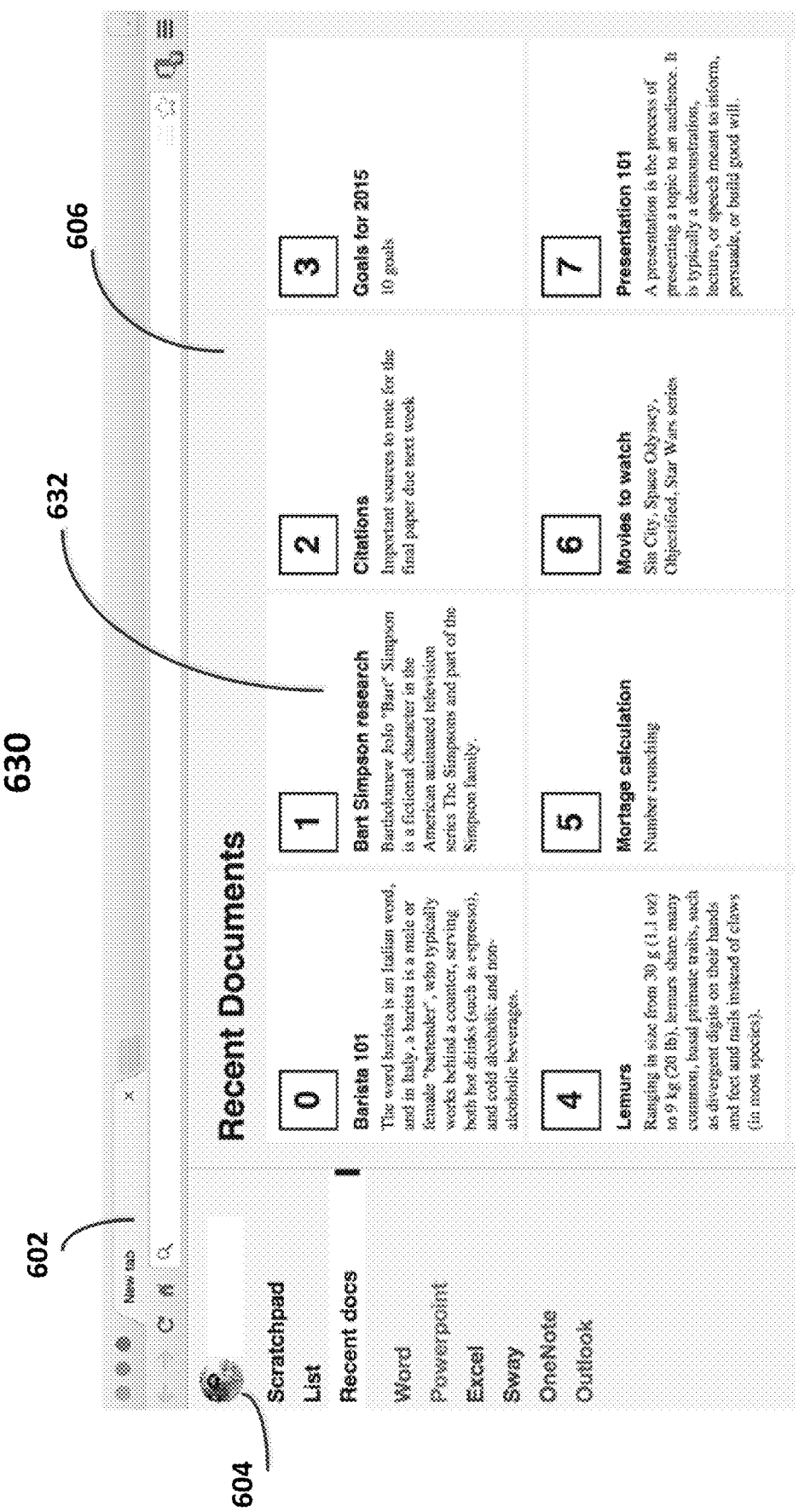

FIG. 6C illustrates processing device view 630 which provides display of a link to a recent document listing 632 that is displayable within a tab 602 of the web browser application. As an example, a link to a recent document listing may be selected in the first application window 604. In response to the selection, a listing of recent documents 632 is displayed in the second application window 606. The listing of recent documents 632 may comprise one or one types of content (e.g., documents, files, links) that is associated with one or more application services and/or processing devices. As an example, the listing of recent documents 632 may be associated with a user account of a user who is logged into the web browser application. For example, the web browser application may enable a user to logon to his or her user account and utilize the web browser extension to interface with one or more processing devices and/or associated application services associated with the user. As shown in processing device view 630, the listing of recent documents 632 comprises a summary for each of the recent documents associated with the user. The summary may be at least one of: a brief synopsis of content of the document, data about the title of the document or content within the document (e.g., fact, description, statistical analysis of document, suggestions/recommendations, and linked notes/events), among other examples. In examples, a user may utilize the second application window 606 to launch one or more documents from the listing of recent documents 632.

FIG. 7A illustrates processing device view 700 which provides display of a history notification 702 that is provided within the web browser application based on processing by an exemplary web browser extension. Processing device view 700 illustrates display of content, for example in an application window of a web browser application. The web browser extension may provide added functionality to the web browser application where a history of documents searched can be associated with selected content within the web browser application. Processing device view 700 comprises a history notification 702, which is a user interface element that provides notification of potentially related documents, links, previously searched websites and previously accessed content, based on processing performed by the web browser extension. Examples of related content included in the history notification 702 may include but is not limited to: websites previously accessed using the web browser application, content accessed by a user through an associated application service and accessed locally on a processing device associated with the user, among other examples. In one example, a user may select content that is displayed within the web browser application. In response to selection of the content, the web browser extension may perform event processing to evaluate the selected content and provide the history notification 702. In some examples, suggestions/recommendations may be generated based on at least one of the selected content and results retrieved in the history notification 702.

FIG. 7B illustrates processing device view 720 which provides display of a history for inspiration icon 722 is provided within the web browser application based on processing by an exemplary web browser extension. The web browser extension may provide added functionality to the web browser application where the history for inspiration icon 722 provides a history of content suggestions/recommendations based on content currently displayed in the web browser application. Processing device view 700 comprises a history for inspiration icon 722, which is a user interface element that provides notification of potentially related documents, links, previously searched websites and previously accessed content, and suggestions/recommendations, based on content that is currently displayed within the web browser application. The web browser extension may perform event processing to evaluate current content that is displayed within the web browser application or alternatively a current thread of the content. A current thread may be a thread that a user is actively engaging. In one example, the web browser extension may implement event processing (e.g. API, processing operation, event control, listener) to detect an input focus within the web browser application. In some examples, a user may have more than one thread open. In such an example, a user may switch between active threads. The web browser extension is configured to detect change between threads and identify a current thread the user is working with. Furthermore, threads in applications may dynamically change, for example, when new data/content/users are added to a thread. The web browser extension is also able to detect change updates to threads in an exemplary web browser application.

FIG. 8 is an exemplary method for content search and retrieval utilizing an exemplary web browser extension with which aspects of the present disclosure may be practiced. As an example, method 800 may be executed by an exemplary processing device and/or system such as those shown in FIGS. 1-4. In one example, system 400 of FIG. 4 describes examples of components that may be used for implementation of method 800. In examples, method 800 may be executed on a device comprising at least one processor configured to store and execute operations, programs or instructions. However, method 800 is not limited to such examples. In at least one example, method 800 may be executed (e.g., computer-implemented operations) by one or more components of a distributed network, for instance, web service/distributed network service (e.g., cloud service). In examples, operations performed in method 800 may correspond to operations executed by a system and/or service that execute computer programs, application programming interfaces (APIs), or machine-learning processing, among other examples.

Method 800 begins at operation 802 where a web browser application is provided. Operation 802 may comprise providing a web browser application that comprises an exemplary web browser extension (as previously described). In alternative examples, operation 802 comprises displaying a launched web browser application as well as a launched web browser extension that is obtained independently from the web browser application. In such an example, execution of the web browser extension integrates the web browser extension with the web browser application. The web browser extension enables at least one application service to interface with the web browser application.

Flow proceeds to operation 804, where input is received into a URL bar of the web browser application. In response to receiving an input into the URL bar, flow proceeds to operation 806 where the received input is processed by the web browser extension. An exemplary web browser extension may be configured to perform event processing to detect input and evaluate a received input. Processing of the received input may comprise performing event processing to evaluate the received input (e.g., characters, delimiters) and context signals associated with the received input. Operation 806 may further comprise detecting entry of a delimiter triggering the web browser application to pass the input to the application service. As an example, the delimiter is at least one selected from a group consisting of: a keystroke, a touch input, a voice input, a handwritten input, and a selection using a device. For instance, the keystroke may be a tab key that triggers the web browser extension to pass a received input (or a next received input) to an application service for further processing. As an example, further processing comprises a request to search the application service for content associated with the received input.

Flow proceeds to operation 808 where a searching of the application service is launched directly from the URL bar. The searching passes processing (operation 806) of the received input to the application service to retrieve results (operation 810) based on the searching. In examples, the web browser extension may pass the received input and user context signals associated with the received input to the application service to evaluate results data. In an alternative example, operation 808 may comprise locally searching a processing device executing the web browser application for content associated with the received input.

Flow may proceed to operation 810 where results may be retrieved based on the searching. In one example, operation 810 may comprise retrieving results from at least one application service associated with the web browser extension. In an alternative example, operation 810 may further comprise retrieving results based on a local search of a processing device executing the web browser application.

Operation 812 may comprise displaying the retrieved results within the web browser application. In one example, operation 812 may comprise displaying the retrieved results within the URL bar. Displaying (operation 812) may comprise displaying the results on a processing device executing the web browser application or a display connected with the processing device. In one example, operation 812 may comprise the retrieved results in a drop down menu of the URL bar.

Flow may proceed to operation 814 where a selection of at least one result of the retrieved results is recognized by the processing device executing the web browser application. In response to the selection, content (e.g., a document, file, link, portion of data) associated with the received selection is displayed (operation 816) within the web browser application. Display (operation 816) of the content may comprise displaying the content in a current tab or opening the content in a new tab of the web browser application.

Flow may proceed to decision operation 818, where it is determined whether an update is received to a received input. If no update is received to the received input, flow branches NO and the web browser extension remains active (and idle) to process subsequent received input. In examples, operation 818 is not restricted to occurring after content is selected. Update to received input is listened anytime the web browser extension is enabled and executing. When it is detected that received input has changed, flow branches YES and returns to operation 804 to process the received input.

FIG. 9 is an exemplary method for launching, utilizing an exemplary web browser extension, a new tab in a web browser application with which aspects of the present disclosure may be practiced. As an example, method 900 may be executed by an exemplary processing device and/or system such as those shown in FIGS. 1-4. In one example, system 400 of FIG. 4 describes examples of components that may be used for implementation of method 900. In examples, method 900 may be executed on a device comprising at least one processor configured to store and execute operations, programs or instructions. However, method 900 is not limited to such examples. In at least one example, method 900 may be executed (e.g., computer-implemented operations) by one or more components of a distributed network, for instance, web service/distributed network service (e.g., cloud service). In examples, operations performed in method 900 may correspond to operations executed by a system and/or service that execute computer programs, application programming interfaces (APIs), or machine-learning processing, among other examples.

Method 900 begins at operation 902 where a web browser application is provided. Operation 902 may comprise providing a web browser application that comprises an exemplary web browser extension (as previously described). In alternative examples, operation 902 comprises displaying a launched web browser application as well as a launched web browser extension that is obtained independently from the web browser application. In such an example, execution of the web browser extension integrates the web browser extension with the web browser application. The web browser extension enables at least one application service to interface with the web browser application.

Flow may proceed to operation 904, where a request is received to launch a new tab within the web browser application. In response to receiving the request, flow may proceed to operation 906 where the received request is processed. In response to processing the received request to launch a new tab, flow proceeds to operation 908 where a new tab is launched. Launch of a new tab is described in detail in the description related to FIGS. 6A and 6B described above. In one example, the new tab comprises a scratchpad that is a notepad feature that integrates the plurality of application services within the web browser application.

FIG. 10 is an exemplary method processing that utilizes a web browser extension to process received input into a new tab of a web browser application with which aspects of the present disclosure may be practiced. As an example, method 1000 may be executed by an exemplary processing device and/or system such as those shown in FIGS. 1-4. In one example, system 400 of FIG. 4 describes examples of components that may be used for implementation of method 1000. In examples, method 1000 may be executed on a device comprising at least one processor configured to store and execute operations, programs or instructions. However, method 1000 is not limited to such examples. In at least one example, method 1000 may be executed (e.g., computer-implemented operations) by one or more components of a distributed network, for instance, web service/distributed network service (e.g., cloud service). In examples, operations performed in method 1000 may correspond to operations executed by a system and/or service that execute computer programs, application programming interfaces (APIs), or machine-learning processing, among other examples.

Method 1000 begins at operation 1002, where a new tab is launched within a web browser application. Launch of a new tab is described in detail in the description related to FIGS. 6A and 6B described above. In one example, the new tab comprises a scratchpad that is a notepad feature that integrates the plurality of application services within the web browser application.

Flow may proceed to operation 1004 where input is received into the scratchpad of the new tab. As an example, the scratchpad is displayed in an application window of the web browser application. Operation 1004 may further comprise detecting receipt of the input through event processing performed by the web browser extension. Flow may proceed to operation 1006, where the received input is processed. Processing of the received input may comprise performing event processing to evaluate the received input (e.g., characters, delimiters). Processing (operation 1006) of the received input may further comprise detecting at least one character of a delimiter in the received input, wherein the delimiter is a trigger for processing by the at least one application service. The received input may be displayed (operation 1008) within an application window of the new tab. In one example of method 1000, flow comprises displaying (operation 1010) a listing of a plurality of delimiters in response to detecting input of at the least one character of the delimiter.

Flow may further proceed to operation 1012, where a selection of an action is received in response to displaying the processed input. In one example, a delimiter may be selected (operation 1012) by a user of the web browser application in response to display of the listing of delimiters. As another example, an action is at least one selected from a group consisting of: an action to transmit the processed input to at least one of the plurality of application services, an action to generate a link to a scratchpad entry, an action to generate a document from the scratchpad entry, and an action to delete the processed input. Whatever the action is within the web browser application, flow may proceed to execute (operation 1014) the selected action.

FIG. 11 is an exemplary method for content display in a new tab of a web browser application that implements an exemplary web browser extension with which aspects of the present disclosure may be practiced. As an example, method 1100 may be executed by an exemplary processing device and/or system such as those shown in FIGS. 1-4. In one example, system 400 of FIG. 4 describes examples of components that may be used for implementation of method 1100. In examples, method 1100 may be executed on a device comprising at least one processor configured to store and execute operations, programs or instructions. However, method 1100 is not limited to such examples. In at least one example, method 1100 may be executed (e.g., computer-implemented operations) by one or more components of a distributed network, for instance, web service/distributed network service (e.g., cloud service). In examples, operations performed in method 1100 may correspond to operations executed by a system and/or service that execute computer programs, application programming interfaces (APIs), or machine-learning processing, among other examples.

Method 1100 begins at operation 1102 where a new tab is launched in a web browser application. Launching of a new tab is described in further detail in at least the description of FIGS. 6A and 6B as well as the above described methods. Flow may proceed to receive (operation 1104) a selection of a recent document listing within the launched new tab. As an example, the launched new tab may comprise an application window that comprises a link to view a listing of recent documents. A listing of recent documents has been described in detail in the description of FIG. 6C.

Flow may proceed to receive (operation 1108) a selection of a document from the listing of recent documents displayed in the new tab. In response to receiving (operation 1108) the selection of the document, flow may proceed to operation 1110, where the selected document is displayed in the tab. In an alternative example, the selected document may be displayed in another launched tab within the web browser application.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
   providing, by a processing device, a web browser application that comprises an extension enabling one or more application services to interface with the web browser application, the one or more application services configured for accessing personal content of a user that is external to the web browser application;
   receiving a first input in a uniform resource locator (URL) bar of the web browser application;
   based on receiving the first input, causing display of a first candidate list for selection from the URL bar for searching by the web browser application;
   receiving, subsequent to receiving the first input, a delimiter on the URL bar, wherein the delimiter comprises a reserved command key that corresponds to an application service associated with personal content;

in response to receiving the delimiter, causing display of an indicator representing the application service in the URL bar;

receiving a second input in the URL bar for searching the personal content associated with the application service;

in response to receiving the second input in the URL bar, triggering the web browser application to pass the second input to the application service for searching the personal content;

causing display of a second candidate list including results of searching the personal content associated with the application service; and in response to receiving a selection from the second candidate list, causing display of a selected result of the personal content on a display connected with the processing device.

2. The computer-implemented method according to claim 1, wherein the delimiter is at least one selected from a group consisting of: a keystroke, a touch input, a voice input, a handwritten input, or a selection using a device.

3. The computer-implemented method according to claim 2, wherein the keystroke is a tab key.

4. The computer-implemented method according to claim 1, wherein causing the display of the second candidate list comprises displaying the results from the application service in a drop down menu of the URL bar.

5. The computer-implemented method according to claim 4, further comprising receiving selection of a result from the results, and displaying a document corresponding with the selected result in the web browser application.

6. The computer-implemented method according to claim 5, further comprising displaying an update notification regarding content of two or more application services associated with the web browser application, the update notification indicating a change in content of first and second application services.

7. The computer-implemented method according to claim 4, further comprising receiving an update to the first input, retrieving updated results from the application service, and displaying the updated results within a drop down menu of the URL bar.

8. A system comprising:
at least one processor; and
a memory, operatively connected with the at least one processor, wherein the memory stores computer-executable instructions that, when executed, cause the processor to perform:
providing a web browser application that comprises an extension enabling one or more application services to interface with the web browser application, the one or more application services configured for accessing third-party content that is external to the web browser application;
receiving a first input in a uniform resource locator (URL) bar of the web browser application;
based on receiving the first input, causing display of a first candidate list for selection from the URL bar for searching by the web browser application;
receiving, subsequent to receiving the first input, a delimiter on the URL bar, wherein the delimiter comprises a reserved command key that corresponds to an application service associated with personal content;
in response to receiving the delimiter, causing display of an indicator representing the application service in the URL bar;
receiving a second input in the URL bar for searching the personal content associated with the application service;
in response to receiving the second input in the URL bar, triggering the web browser application to pass the second input to the application service for searching the personal content;
causing display of a second candidate list including results of the search of the personal content associated with the application service; and
in response to receiving a selection from the second candidate list, causing display of a selected result of the personal content on a display connected with a processing device.

9. The system according to claim 8, wherein the delimiter is at least one selected from a group consisting of: a keystroke, a touch input, a voice input, a handwritten input, or a selection using a device.

10. The system according to claim 9, wherein the keystroke is a tab key.

11. The system according to claim 8, wherein causing the display of the second candidate list comprises displaying the results from the application service in a drop down menu of the URL bar.

12. The system according to claim 11, wherein the memory stores computer-executable instructions that, when executed, cause the processor to perform: receiving selection of a result from the results, and displaying a document corresponding with the selected result in the web browser application.

13. The system according to claim 11, wherein the memory stores computer-executable instructions that, when executed, cause the processor to perform: receiving an update to the first input, retrieving updated results from the application service, and displaying the updated results within a drop down menu of the URL bar.

14. A computer storage device storing computer-executable instructions that, when executed, cause a processor to:
provide a web browser application that comprises an extension enabling one or more application services to interface with the web browser application, the one or more application services configured for accessing third-party content that is external to the web browser application;
receive a first input in a uniform resource locator (URL) bar of the web browser application;
based on receiving the first input, causing display of a first candidate list for selection from the URL bar for searching by the web browser application;
receiving, subsequent to receiving the first input, a delimiter on the URL bar, wherein the delimiter comprises a reserved command key that corresponds to an application service associated with personal content;
in response to receiving the delimiter, causing display of an indicator representing the application service in the URL bar;
receiving a second input in the URL bar for searching the personal content associated with the application service;
in response to receiving the second input in the URL bar, triggering the web browser application to pass the second input to the application service for searching the personal content;
cause display of a second candidate list including results of searching the personal content associated with the application service; and in response to receiving a selection from the second candidate list, causing display of a selected result of the personal content on a display connected with a processing device.

15. The computer storage device according to claim 14, wherein the delimiter is at least one selected from a group consisting of: a keystroke, a touch input, a voice input, a handwritten input, or a selection using a device.

16. The computer storage device according to claim 15, wherein the keystroke is a tab key.

17. The computer storage device according to claim 14, wherein the computer-executable instructions further cause the processor to display the results from the application service in a drop down menu of the URL bar.

18. The computer storage device according to claim 14, wherein the computer-executable instructions further cause the processor to:

receive a selection of a result from the retrieved results; and display a document corresponding with the selected result in the web browser application.

19. The computer storage device according to claim 14, wherein the computer-executable instructions further cause the processor to:

receive an update to the first input;

retrieve updated results from the application service; and display the updated results within a drop down menu of the URL bar.

20. The computer storage device according to claim 14, wherein the computer-executable instructions further cause the processor to:

display an indication of the delimiter, wherein the delimiter comprises one or more key presses.

* * * * *